(12) United States Patent
Wifvesson et al.

(10) Patent No.: US 12,041,441 B2
(45) Date of Patent: Jul. 16, 2024

(54) SMALL DATA COMMUNICATION SECURITY

(71) Applicant: Telefonaktiebolaget LM Ericsson (publ), Stockholm (SE)

(72) Inventors: Monica Wifvesson, Lund (SE); Noamen Ben Henda, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 369 days.

(21) Appl. No.: 17/289,300

(22) PCT Filed: Oct. 15, 2019

(86) PCT No.: PCT/EP2019/077869
§ 371 (c)(1),
(2) Date: Apr. 28, 2021

(87) PCT Pub. No.: WO2020/088928
PCT Pub. Date: May 7, 2020

(65) Prior Publication Data
US 2021/0409940 A1    Dec. 30, 2021

Related U.S. Application Data

(60) Provisional application No. 62/755,045, filed on Nov. 2, 2018.

(51) Int. Cl.
*H04W 12/0431* (2021.01)
*H04W 12/033* (2021.01)
*H04W 12/041* (2021.01)

(52) U.S. Cl.
CPC ..... *H04W 12/0431* (2021.01); *H04W 12/033* (2021.01); *H04W 12/041* (2021.01)

(58) Field of Classification Search
CPC ........... H04W 12/0431; H04W 12/033; H04W 12/041; H04W 4/70; H04L 9/0891; H04L 9/0819; H04L 2209/80; H04L 9/0861
See application file for complete search history.

(56) References Cited

U.S. PATENT DOCUMENTS

| 9,913,177 B2 * | 3/2018 | Sharma ............. H04W 12/0431 |
| 2016/0191471 A1 * | 6/2016 | Ryoo .................... H04L 63/062 455/411 |

(Continued)

OTHER PUBLICATIONS

C. B. Sankaran, 2009 IEEE, Communications Magazine, LTE—3GPP Release 8, "Network Access Security in Next-Generation 3GPP Systems: A Tutorial", pp. 84-91 (Year: 2009).*

(Continued)

*Primary Examiner* — Khalil Naghdali
(74) *Attorney, Agent, or Firm* — Murphy, Bilak & Homiller, PLLC

(57) ABSTRACT

Methods and apparatus for small data communications over a user plane in a wireless communication network. A method performed by a wireless device comprises receiving, from mobility management network equipment (e.g., implementing an AMF), control signaling indicating that the wireless device is to horizontally derive a base security key and/or that the wireless device is to derive a small data transfer, SDT, security key from the base security key. The base security key may be included in a non-access stratum, NAS, security context at the wireless device and at the mobility management network equipment. The method may further comprise, responsive to receiving the control signaling, deriving the SDT security key from the base security key and a freshness parameter.

22 Claims, 14 Drawing Sheets

(56) References Cited

U.S. PATENT DOCUMENTS

2016/0366175 A1* 12/2016 Basu Mallick ..... H04L 63/1416
2018/0343566 A1* 11/2018 Yu ..................... H04W 12/041
2020/0336952 A1* 10/2020 Suh .................... H04W 36/14

OTHER PUBLICATIONS

3GPP, "3GPP TR 33.861 V0.2.0", 3rd Generation Partnership Project; Technical Specification Group Services and System Aspects; Study on evolution of Cellular IoT security for the 5G System (Release 16), Sep. 2018, 1-12.

3GPP, "3GPP TS 22.261 V15.6.0", 3rd Generation Partnership Project; Technical Specification Group Services and System Aspects; Service requirements for the 5G system; Stage 1 (Release 15), Sep. 2018, 1-53.

3GPP, "3GPP TS 23.502 V15.6.0", 3rd Generation Partnership Project; Technical Specification Group Services and System Aspects; Procedures for the 5G System; Stage 2 (Release 15), Jun. 2019, 1-357.

3GPP, "3rd Generation Partnership Project; Technical Specification Group Services and System Aspects; Security architecture and procedures for 5G system (Release 15)", 3GPP TS 33.501 V15.2.0 (Sep. 2018), Sep. 2018, 1-175.

Ericsson, "Evaluation of SA3 LS S3-182637", 3GPP TSG-CT WG1 Meeting #112bis, C1-186513, Vilnius (Lithuania), Oct. 15-19, 2018, 1-4.

Ericsson, et al., "More details on fast path security protocol", 3GPP TSG SA WG3 (Security) Meeting #72, S3-130848 (revision of S3-130778), Qingdao, China, Jul. 8-12, 2013, 1-10.

3GPP, "3GPP TR 23.724 V1.0.0", 3rd Generation Partnership Project; Technical Specification Group Services and System Aspects; Study on Cellular IoT support and evolution for the 5G System (Release 16), Sep. 2018, 1-234.

3GPP, "3GPP TS 22.261 V16.1.0", 3rd Generation Partnership Project; Technical Specification Group Services and System Aspects; Service requirements for the 5G system; Stage 1 (Release 16), Sep. 2017, 1-52.

3GPP, "3GPP TS 23.502 V15.3.0", 3rd Generation Partnership Project; Technical Specification Group Services and System Aspects; Procedures for the 5G System; Stage 2 (Release 15), Sep. 2018, 1-330.

* cited by examiner

SMALL DATA COMMUNICATION SECURITY

TECHNICAL FIELD

The present disclosure relates to methods and apparatus for small data communication security, especially for small data communications over a user plane in a wireless communication network.

BACKGROUND

Wireless communication systems have traditionally been designed to support the transfer of large data amounts. This traditional design operates on the assumption that the amount of user data transferred over any given connection far exceeds the amount of control signalling required to set up that connection; that is, the control signalling overhead for connection setup is insignificant compared to the amount of user data to be transferred. The advent of the internet-of-things (IoT) and other use cases for wireless communication, though, have introduced the need for sporadic transfer of smaller data amounts and have therefore challenged the underlying assumptions on which networks have traditionally been designed. Indeed, these use cases provoke the transfer of user data amounts which are so small that connection setup requires significant control signalling overhead.

Wireless communication systems have accordingly been optimized to better support the transfer of smaller data amounts. One optimization provides small data communications over the user plane, e.g., in the form of user plane (UP) cellular IoT (CIoT) Enhanced Packet System (EPS) optimization. Small data communication over the user plane may support the transfer of user data over the user plane using a previously set up connection. The previously set up connection may be suspended and resumed as needed, without having to again configure the connection, e.g., in terms of an access stratum (AS) context. In this way, small data communication over the user plane may enable the transfer of user plane data without the need for using a service request procedure to establish an AS context in the radio access network (RAN) and the wireless device (e.g., user equipment, UE). This in turn eliminates or reduces control signalling overhead.

Although small data communication over the user plane optimizes control signalling overhead, ensuring the security of such communication (e.g., in terms of confidentiality and/or integrity protection) proves challenging in some contexts. Complexities arise, for example, in ensuring that small data communications remain secure as a wireless device moves throughout the network.

SUMMARY

Some embodiments herein trigger a wireless device to derive new/updated security key(s) based on which small data communications are protected, under certain circumstances. The wireless device may be triggered to do so, for example, in response to horizontal derivation of a new/updated base security key from which the security key(s) are derived. Such horizontal derivation may occur for instance due to wireless device mobility (e.g., a change of access and mobility function, AMF, or user plane function, UPF, serving the wireless device) or periodic base key refresh. Deriving new/updated security keys for small data communications in these and other circumstances may advantageously ensure protection of the small data communications, e.g., despite wireless device mobility.

More particularly, some embodiments include a method performed by a wireless device for small data communications over a user plane in a wireless communication network. The method may comprise receiving, from mobility management network equipment (e.g., implementing an AMF), control signaling indicating that the wireless device is to horizontally derive a base security key and/or that the wireless device is to derive a small data transfer, SDT, security key from the base security key. The base security key may be included in a non-access stratum, NAS, security context at the wireless device and at the mobility management network equipment. The method in some embodiments also includes, responsive to receiving the control signaling, deriving the SDT security key from the base security key and a freshness parameter.

Embodiments further include a corresponding method performed by mobility management network equipment for facilitating small data communications over a user plane in a wireless communication network. The method includes transmitting, from the mobility management network equipment to a wireless device, control signaling indicating that the wireless device is to horizontally derive a base security key and/or that the wireless device is to derive a small data transfer, SDT, security key from the base security key. The base security key may be included in a non-access stratum, NAS<security context for the wireless device.

Embodiments also include a method performed by a wireless device for small data communications in a wireless communication network. The method comprises deriving, from a small data transfer, SDT, security key included in a small data security context established at the wireless device and at mobility management network equipment configured for mobility management, a user plane security key in the small data security context. The method may also comprise receiving control signaling indicating that the wireless device is to derive a new user plane security key in the small data security context. In some embodiments, the method further comprises deriving, from the SDT security key or a new SDT security key, and from a freshness parameter, the new user plane security key in the small data security context.

Embodiments moreover include a method performed by session management network equipment for facilitating small data communications in a wireless communication network. The method comprises deriving, from a small data transfer, SDT, security key included in a small data security context for the wireless device, and from a freshness parameter, a new user plane security key in the small data security context. The method may also comprise transmitting control signaling indicating that the wireless device is to derive the new user plane security key in the small data security context.

Embodiments also include a wireless device for facilitating small data communications in a wireless communication network. The wireless device comprises processing circuitry and memory. The memory contains instructions executable by the processing circuitry whereby the wireless device is configured to receive, from mobility management network equipment (e.g., implementing an AMF), control signaling indicating that the wireless device is to horizontally derive a base security key and/or that the wireless device is to derive a small data transfer, SDT, security key from the base security key. The base security key may be included in a non-access stratum, NAS, security context at the wireless device and at the mobility management network equipment.

In some embodiments, the memory may further contain instructions executable by the processing circuitry whereby the wireless device is configured to responsive to receiving the control signaling, deriving the SDT security key from the base security key and a freshness parameter.

Embodiments also include Mobility management network equipment for facilitating small data communications in a wireless communication network. The Mobility management network equipment comprises processing circuitry and memory. The memory contains instructions executable by the processing circuitry whereby the mobility management network equipment is configured to transmit, from the mobility management network equipment to a wireless device, control signaling indicating that the wireless device is to horizontally derive a base security key and/or that the wireless device is to derive a small data transfer, SDT, security key from the base security key. The base security key may be included in a non-access stratum, NAS<security context for the wireless device.

Embodiments also include a wireless device for facilitating small data communications in a wireless communication network. The wireless device comprises processing circuitry and memory. The memory contains instructions executable by the processing circuitry whereby the wireless device is configured to derive, from a small data transfer, SDT, security key included in a small data security context established at the wireless device and at mobility management network equipment configured for mobility management, a user plane security key in the small data security context. The memory may further contain instructions executable by the processing circuitry whereby the wireless device is configured to receive control signaling indicating that the wireless device is to derive a new user plane security key in the small data security context. In some embodiments, the memory may further contain instructions executable by the processing circuitry whereby the wireless device is configured to derive, from the SDT security key or a new SDT security key, and from a freshness parameter, the new user plane security key in the small data security context.

Embodiments also include Session management network equipment for facilitating small data communications in a wireless communication network. The Session management network equipment comprises processing circuitry and memory. The memory contains instructions executable by the processing circuitry whereby the session management network equipment is configured to derives, from a small data transfer, SDT, security key included in a small data security context for the wireless device, and from a freshness parameter, a new user plane security key in the small data security context. The memory may further contain instructions executable by the processing circuitry whereby the session management network equipment is configured to transmit control signaling indicating that the wireless device is to derive the new user plane security key in the small data security context.

Embodiments also include corresponding computer programs and carriers. A computer program comprises instructions which, when executed on at least one processor of an apparatus, cause the apparatus to carry out any of the embodiments described above. Embodiments further include a carrier containing such a computer program. This carrier may comprise one of an electronic signal, optical signal, radio signal, or computer readable storage medium.

BRIEF DESCRIPTION OF THE DRAWINGS

The inventive concept is now described, by way of example, with reference to the accompanying drawings, in which.

DETAILED DESCRIPTION

Figure 1:
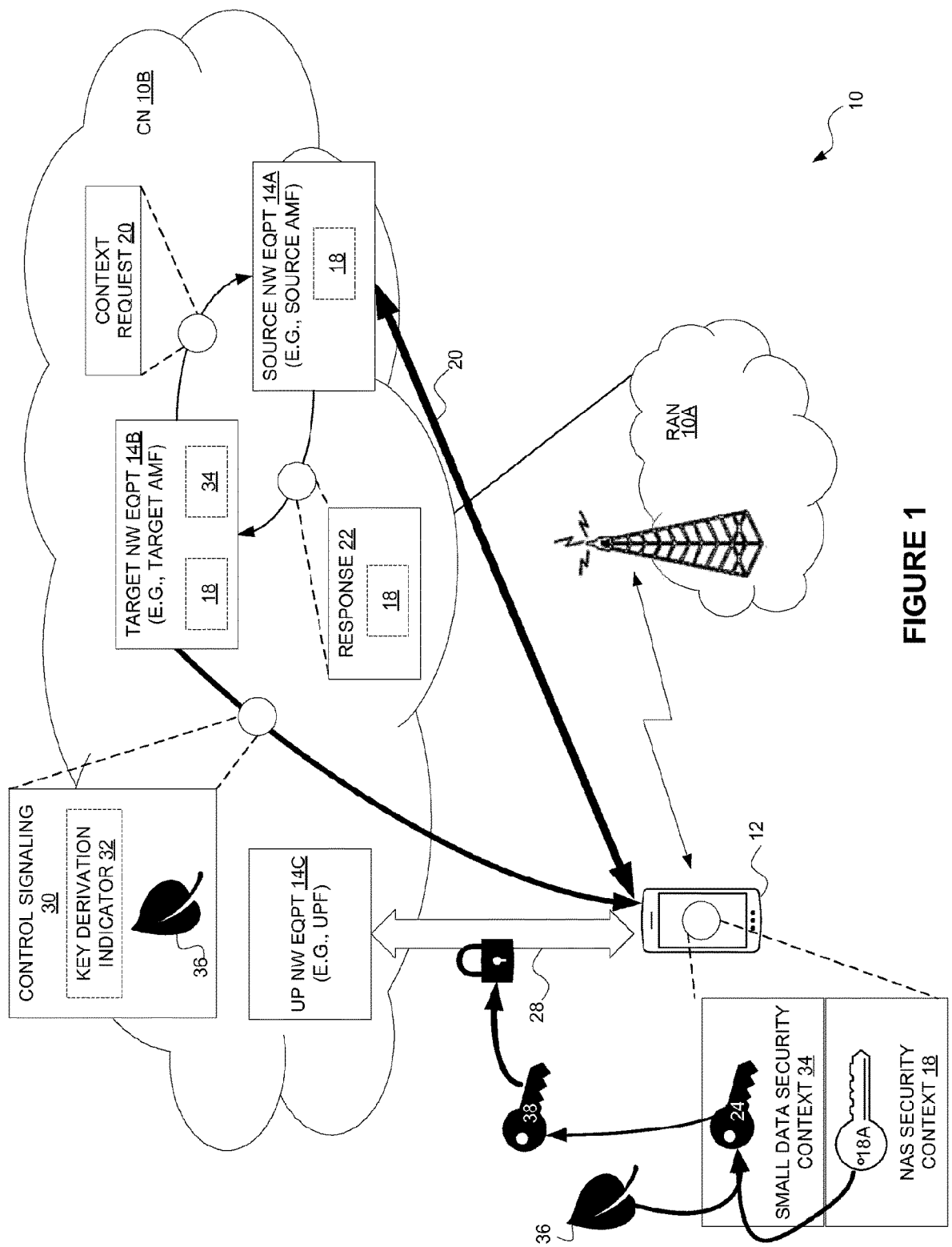
FIG. 1 is a block diagram of a wireless communication system according to some embodiments.

FIG. 1 shows a wireless communication network (e.g., a 5G network) 10 according to some embodiments. The wireless communication network 10 includes a radio access network (RAN) 10A via which a wireless device 12 (e.g. a user equipment UE) connects to a core network (CN) 10B. FIG. 1 shows that the wireless communication network 10 includes network equipment (NW EQPT) 14A and 14B, e.g., in the CN 10B, configured for managing access and/or mobility of the wireless device 12. Where the wireless communication network 10 is a 5G network, the network equipment 14A and/or 14B may each implement an access and mobility function (AMF).

Regardless, the wireless device 12 is configured to establish a non-access stratum (NAS) security context 18 (e.g., a 5G NAS security context) with network equipment 14A. The security context 18 includes a base security key 18A (e.g., a key $K_{AMF}$ where the network equipment 14A implements an AMF). The NAS security context 18 in some embodiments further includes an integrity key (e.g., $K_{AMFint}$) derived from the security key 18A and/or an encryption key (e.g., $K_{AMFenc}$) derived from the base security key 18A. In some embodiments, for example, the wireless device 12 and the network equipment 14A establish a control plane connection 20 (e.g., a non-access stratum, NAS, connection) and exchange control plane messages (e.g., NAS messages) over the control plane connection 20, with those messages integrity protected using the integrity key and/or ciphered using the encryption key.

FIG. 1 shows that the wireless device 12 (e.g., due to mobility, such as idle mode mobility) switches from network equipment 14A (referred to now as source network equipment 14A) to target network equipment 14B. The target network equipment 14B fetches the NAS security context 18 from the source network equipment 14A, e.g., by transmitting a context request 20 to the target network equipment 14B and receiving the NAS security context 18 in a response 22. However, before providing the target network equipment 14B with the NAS security context 18, the source network equipment 14A may update or refresh the base security key 18A, by horizontally deriving a new base security key 18A from the old base security key. Such horizontal derivation may mean that the new base security key 18A is at the same hierarchical level of a key hierarchy as the old base security key. In 5G embodiments, for instance, the old base security key may be a key $K_{AMF}$, and the new base security key may be a key $K_{AMF}'$. Regardless, the target network equipment 14B may obtain (e.g., receive) the new base security key 18A as horizontally derived.

In other embodiments, the new base security key 18A may be horizontally derived from the old base security key even in circumstances besides device mobility, e.g., in anticipation of counter wraparound or other conditions justifying periodic refresh. In this case, then, the network equipment 14B may be considered to already have the NAS security context 18 and may itself horizontally derive the new base security key 18A.

No matter the reason or trigger for horizontal derivation of the new base security key 18A, upon such horizontal derivation some embodiments herein trigger the wireless device 12 to derive new/updated security key(s) 24, 26 based on which small data communications 28 are protected. Such small data communications 28 may for instance comprise small data fast path (SDFP) communications, or data communications performed according to UP CIoT EPS optimization. Regardless, deriving new/updated security keys 24, 26 for small data communications 28 in these and other circumstances may advantageously ensure protection of the small data communications 28, e.g., despite wireless device mobility.

More particularly, the network equipment 14B as shown in FIG. 1 is configured to transmit control signalling 30 to the wireless device 12, e.g., after or responsive to obtaining the new base security key 18A as horizontally derived. The control signalling 30 may for instance be transmitted to the wireless device 12 during, as part of, or in response to completion of a mobility registration update procedure. In these and other cases, the control signaling may be included in a registration accept message that is a response to a registration request from the wireless device 12. Or, the control signaling 30 may be included in a NAS security mode command.

Regardless of the particular form of the control signaling 30, the control signaling 30 in some embodiments includes a key derivation indicator 32. In one or more embodiments, the key derivation indicator 32 indicates that the wireless device 12 is to itself horizontally derive the base security key 18A. In other embodiments, the key derivation indicator 32 indicates that the wireless device 12 is to derive a small data transfer (SDT) key 24 from the base security key 18A, e.g., where the SDT key 24 is included in a small data security context 34 at the wireless device 12 and the network equipment 14B. In either case, receipt of the key derivation indicator 32 in the control signaling 30 indeed prompts the wireless device 12 to derive the SDT security key 24 from the base security key 18A as well as a freshness parameter 36. This freshness parameter 36 may in some embodiments be included in or otherwise indicated by the control signaling 30. In fact, in some embodiments, inclusion of the freshness parameter 36 in the control signaling 30 functions as an implicit key derivation indicator 32.

In any event, the wireless device 12 in some embodiments further derives, from the SDT security key 24, a user plane security key 38 (e.g., $K_{UPF}$). This user plane security key 38 may also be included in the small data security context 34. Regardless, the wireless device 12 may then transmit or receive, over a user plane path between the wireless device 12 and user plane core network equipment 14C (e.g., UPF or co-located proxy), small data communications 28 as protected with the user plane security key 38 or a derivative thereof. Notably in this regard, then, derivation of the SDT security key 24 may operate to refresh or update the security key(s) 24, 38 with which the small data communications 28 are protected between the wireless device 12 and the user plane network equipment 14C.

Figure 2:
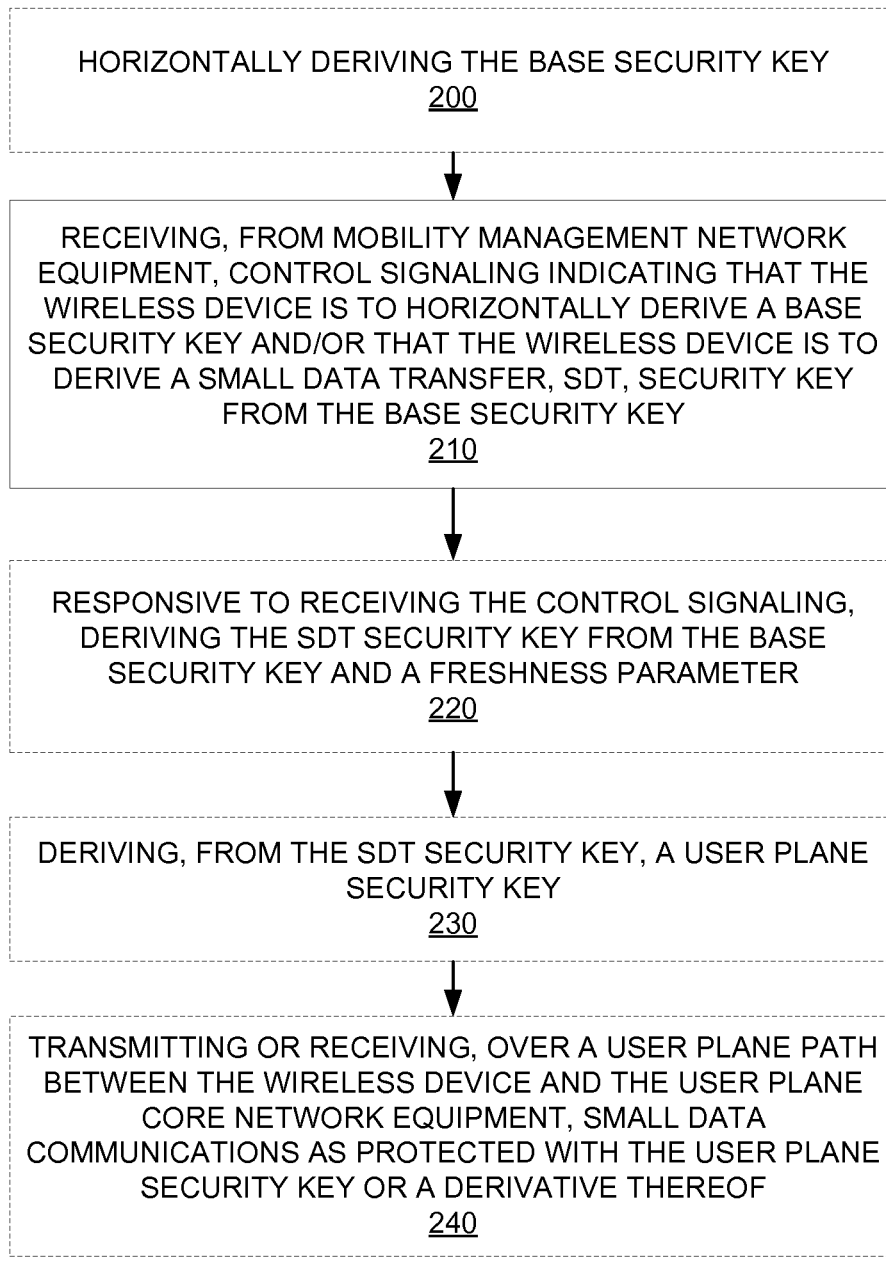
FIG. 2 is a logic flow diagram of a method performed by a wireless device according to some embodiments.

In view of the above modifications and variations, FIG. 2 depicts a method performed by a wireless device 12 for small data communications over a user plane in a wireless communication network 10 in accordance with particular embodiments. The method includes receiving, from mobility management network equipment 18B, control signaling 30 indicating that the wireless device 12 is to horizontally derive a base security key 18A and/or that the wireless device 12 is to derive a small data transfer, SDT, security key 24 from the base security key 18A (Block 2A0). In some embodiments, the base security key 18A is included in a non-access stratum, NAS, security context 18 at the wireless device 12 and at the mobility management network equipment 14B. The method as shown may also include, responsive to receiving the control signaling 30, deriving the SDT security key 24 from the base security key 18A and a freshness parameter 36 (Block 220). In some embodiments, this derivation may be performed after the wireless device itself horizontally derives the base security key 18A (Block 200).

In some embodiments, the method also includes deriving, from the SDT security key 24, a user plane security key 38 (e.g., included in a small data security context 34 established at the wireless device 12 and at user plane core network equipment 14C) (Block 230). In these and other embodiments, the method may further include transmitting or receiving, over a user plane path between the wireless device 12 and the user plane core network equipment 14C, small data communications 28 as protected with the user plane security key 38 or a derivative thereof (Block 240).

Figure 3:
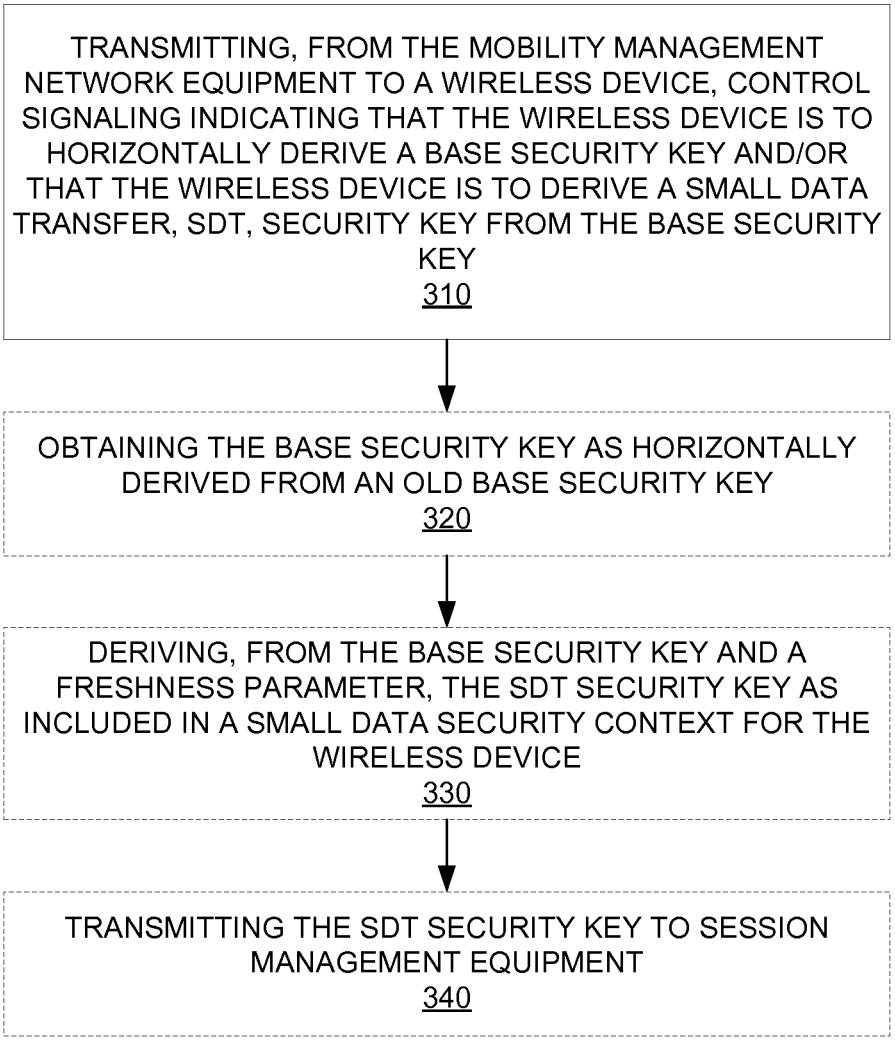
FIG. 3 is a logic flow diagram of a method performed by mobility management network equipment according to some embodiments.

FIG. 3 depicts a method performed by mobility management network equipment 14B for facilitating small data communications over a user plane in a wireless communication network 10 in accordance with particular embodiments. The method includes transmitting, from the mobility management network equipment 14B to a wireless device 12, control signaling 30 indicating that the wireless device 12 is to horizontally derive a base security key 18A and/or that the wireless device 12 is to derive a small data transfer, SDT, security key 24 from the base security key 18A (Block 310).

In some embodiments, the method also includes obtaining the base security key 18A as horizontally derived from an old base security key (Block 320) and deriving, from the base security key 18A and a freshness parameter 36, the SDT security key 24 (e.g., as included in a small data security context 34 for the wireless device) (Block 330). Alternatively or additionally, the method may include transmitting the SDT security key 24 to session management equipment (e.g., session management function, SMF) (Block 340).

Figure 4:
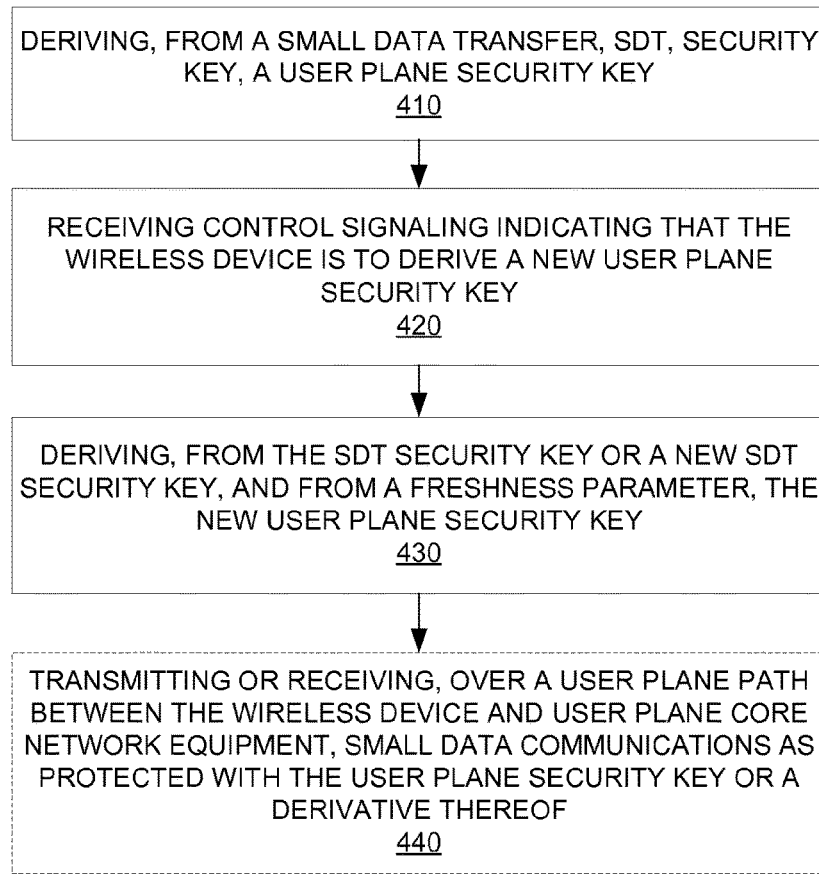
FIG. 4 is a logic flow diagram of a method performed by a wireless device according to other embodiments.

FIG. 4 depicts a method performed by a wireless device 12 for small data communications in a wireless communication network 10 according to still other embodiments. The method includes deriving, from a small data transfer, SDT, security key 24 (e.g., included in a small data security context 34 established at the wireless device 12 and at mobility management network equipment 18A configured for mobility management), a user plane security key 38 (e.g., in the small data security context 34) (Block 400). The method also includes receiving control signaling indicating that the wireless device 12 is to derive a new user plane security key in the small data security context (Block 410). In some embodiments, the method may include deriving, from the SDT security key or a new SDT security key, and from a freshness parameter, the new user plane security key in the small data security context (Block 420).

In some embodiments, the method may further include transmitting or receiving, over a user plane path between the wireless device and user plane core network equipment, small data communications as protected with the user plane security key or a derivative thereof (Block 440).

Figure 5:
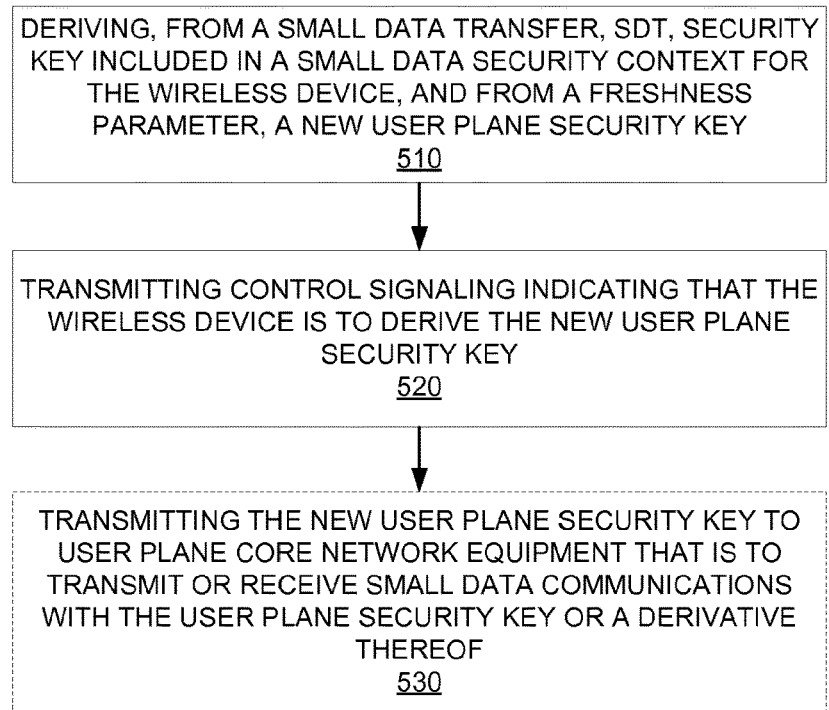
FIG. 5 is a logic flow diagram of a method performed by session management network equipment according to some embodiments.

FIG. 5 depicts a method performed by session management network equipment for facilitating small data communications in a wireless communication network. The method as shown includes deriving, from a small data transfer, SDT, security key (e.g., included in a small data security context for the wireless device), and from a freshness parameter, a new user plane security key (e.g., in the small data security context) (Block 510). The method may also include transmitting control signaling indicating that the wireless device is to derive the new user plane security key (Block 520).

In some embodiments, the method also includes transmitting the new user plane security key to user plane core network equipment that is to transmit or receive small data communications with the user plane security key or a derivative thereof (Block 530).

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 6:
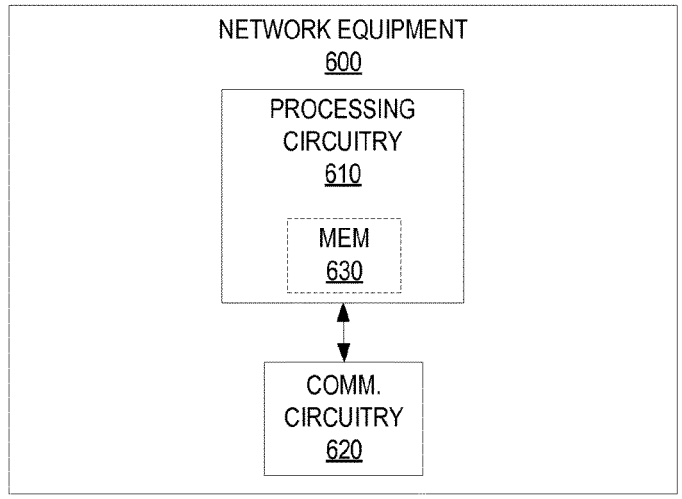
FIG. 6 is a block diagram of network equipment according to other embodiments.

FIG. 6 illustrates network equipment 600 as implemented in accordance with one or more embodiments. The network equipment 600 may for instance be network equipment 14B and/or mobility management network equipment for implementing the processing in FIG. 3. Or, the network equipment 600 may be session management network equipment for implementing the processing in FIG. 5. Regardless, as shown, the network equipment 600 includes processing circuitry 610 and communication circuitry 620. The communication circuitry 620 is configured to transmit and/or receive information to and/or from one or more other nodes, e.g., via any communication technology. The processing circuitry 610 is configured to perform processing described above, e.g., in FIG. 3 and/or 5, such as by executing instructions stored in memory 630. The processing circuitry 610 in this regard may implement certain functional means, units, or modules.

Figure 7:
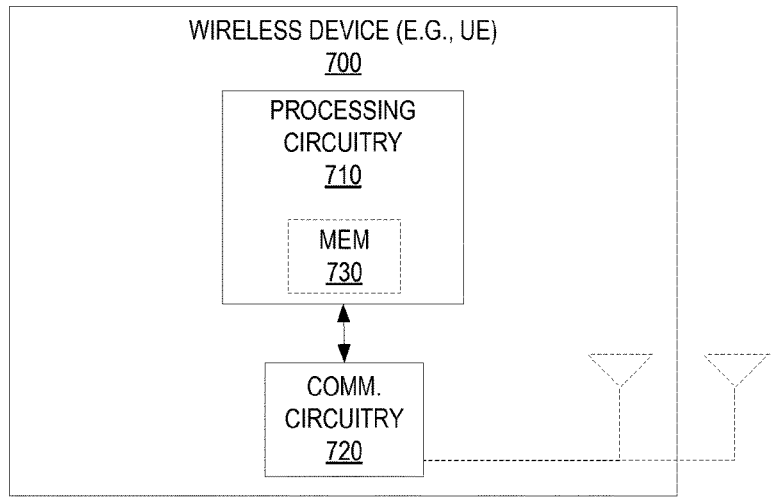
FIG. 7 is a block diagram of a wireless device according to other embodiments.

FIG. 7 illustrates a wireless device YY300 (e.g., wireless device 12) as implemented in accordance with one or more embodiments. As shown, the wireless device YY300 includes processing circuitry YY310 and communication circuitry YY320. The communication circuitry YY320 (e.g., radio circuitry) is configured to transmit and/or receive information to and/or from one or more other nodes, e.g., via any communication technology. Such communication may occur via one or more antennas that are either internal or external to the wireless device YY300. The processing circuitry YY310 is configured to perform processing described above (e.g., in FIG. 2 and/or FIG. 4), such as by executing instructions stored in memory YY330. The processing circuitry YY310 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

3GPP is currently developing the standards for 5G a.k.a. Next Generation (NG) Systems or New Radio (NR) systems. It is expected that 5G will support many new scenarios and use cases and will be an enabler for the internet-of-things (IoT). It is expected that NG systems will provide connectivity to a wide range of new devices such as sensors, smart wearables, vehicles, machines, etc. Flexibility would be then a key property in NG Systems. This is reflected in the security requirement for network access that are mandating the support of alternative authentication methods and different types of credentials than the usual authentication and key agreement (AKA) credentials pre-provisioned by the operator and securely stored in the universal integrated circuit card (UICC). This would allow factory owners or enterprises to leverage their own identity and credential management systems for authentication and access network security.

The 5G systems are expected to provide connectivity/services to a massive number of devices simultaneously. Such devices include IoT devices that may send or receive infrequent or frequent small amount of data. Several possible solutions exist for sending/receiving infrequent or frequent small data, e.g., as specified in 3GPP TR 23.724 [2] based on Small Data Transmission requirements defined in TS 22.261 [1]. According to the current solutions under considerations in TR 23.724 [2], infrequent and frequent small data could be transferred over the control plane in non-access stratum (NAS) signaling messages or using user plane with reduced signaling caused by idle-connected mode transitions.

There are several solutions described in 3GPP TR 23.724 [2] where it is proposed that small data could be protected by the user plane function (UPF) and user equipment (UE). For example: solution 6: Small Data Communication based on Data PDU routed over the User Plane and solution 5: Small data fast path (SDFP) in 3GPP TR 23.724 [2].

Figure 8:
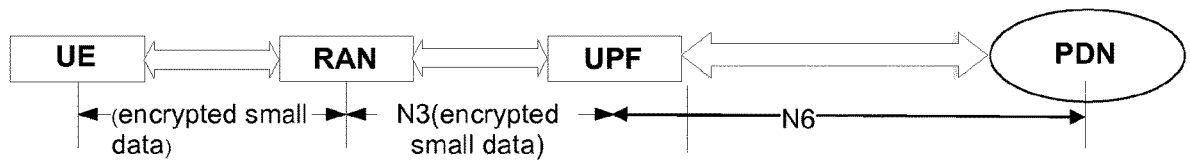
FIG. 8 is a block diagram of Small Data Transmission solution according to some embodiments.

In particular, the Small Data solution described in solution 5 in 3GPP TR 23.724 [2] is shown in FIG. 8 as one example of such a solution where security for small data is provided between UE and UPF, e.g., providing an end to end small data transmission. Solution 5 targets to optimize small data transmission for cellular IoT (CIoT) UEs in CM-IDLE mode. Small data can be passed in a fast path of the user plane without the overhead amount of signaling caused by CM-IDLE/CM-CONNECTED mode transitions.

In this case, the access and mobility function (AMF) derives SDFP security information and provides it to the session management function (SMF). The SMF stores the SDFP security information for the PDU session, enables indicated quality of service (QoS) flows and acknowledges to the AMF that they have been SDFP enabled.

In the SDFP, the UE sends traffic without having set up the regular access stratum (AS) security. The security protection is done by security contexts in the UE and the AMF/SMF/UPF. These are established as part of existing signaling, hence keeping the signaling overhead for small data to a minimum. The SDFP security information is stored in the SMF, UPF and the UE as part of the PDU Session Resource Request information. When the SDFP security information is updated for the UE, the AMF also updates the SMF/UPF with new SDFP security information.

If AMF is changed due to mobility, a new SDFP security information may be established by AMF during the Registration Update procedure and provided to the SMF/UPF and to the UE.

During the UE registration update, the AMF notifies the SMF about the UE location and the SMF may decide to relocate the UPF. During the UE registration update, the AMF may decide to initiate horizontal $K_{AMF}$ derivation due to e.g. AMF change or if the AMF decides to initiate NAS keys refresh.

The solution assumes the Rel-15 5G baseline that the SMF can be used throughout the public land mobile network (PLMN) (e.g. a specific CIoT slice may be used), but UPF can be changed as of described above whenever needed.

In roaming cases, a UPF in the visited PLMN (VPLMN) is used for SDFP support. Notably, though, at mobility in IDLE mode, the UE will initiate a Registration procedure. During the UE initiated registration update procedure, the AMF may decide to initiate horizontal $K_{AMF}$ derivation at e.g. AMF change or if AMF decides to initiate NAS keys refresh. Some embodiments herein concern how the security as security keys for Small Data Fast Path (SDFP) are impacted in UE and AMF/SMF/UPF when horizontal $K_{AMF}$ derivation takes place in AMF. Some embodiments herein account for key separation when it comes to key exchange between network elements, i.e., that the same key shall never be provided to two different network entities.

More particularly, some embodiments propose that, whenever horizontal $K_{AMF}$ derivation takes place in the AMF and a new $K_{AMF}$ key is derived from the current $K_{AMF}$ key, a new $K_{SDT}$ key for SDFP feature is derived from the new $K_{AMF}$ key using a freshness parameter in the AMF and the UE. The freshness parameter may be transferred to the UE together with an indication that the UE needs to derive a new $K_{SDT}$ key from the new $K_{AMF}$ key derived from horizontal $K_{AMF}$ derivation, using a freshness parameter. The indication that the UE needs to derive a new $K_{SDT}$ key from the new $K_{AMF}$ key (derived from horizontal $K_{AMF}$ derivation) using a freshness parameter can be included for example into NAS Security Mode Command message or Registration Accept message. In some embodiments, the freshness parameter could be for example: a SMF ID, a PDU Session ID, a random value, a counter. The inclusion of the freshness parameter stated above could be optional.

Some embodiments have the following advantages: The security keys for SDFP can be refreshed in the AMF/SMF/UPF and UE when horizontal $K_{AMF}$ derivation takes place in the AMF (i.e. when a new $K_{AMF}$ key is derived from the current $K_{AMF}$ key). Then a new $K_{SDT}$ key is derived from the new $K_{AMF}$ key using a freshness parameter in the AMF and the UE.

Consider now a first option at which horizontal $K_{AMF}$ derivation can take place; namely, upon mobility registration update at e.g. AMF change as described in TS 33.501 [2]. In this case, at AMF change, it is proposed according to some embodiments that when horizontal $K_{AMF}$ derivation takes place in the old AMF, the new AMF derives a new K-SDT key from the new K-AMF key and a freshness parameter. For example, in some embodiments, it is proposed to use the horizontal $K_{AMF}$ key derivation feature introduced for the $K_{AMF}$ key to refresh the security keys (K-SDT key, K-UPF keys) for the SDFP feature. In order to activate such a new K-SDT key, either NAS Security Mode Command Procedure or Registration Accept message can be used to so that the UE and the AMF/SMF/UPF synchronize and start using the security context for SDFP based on the newly derived K-SDT key.

Figure 9:
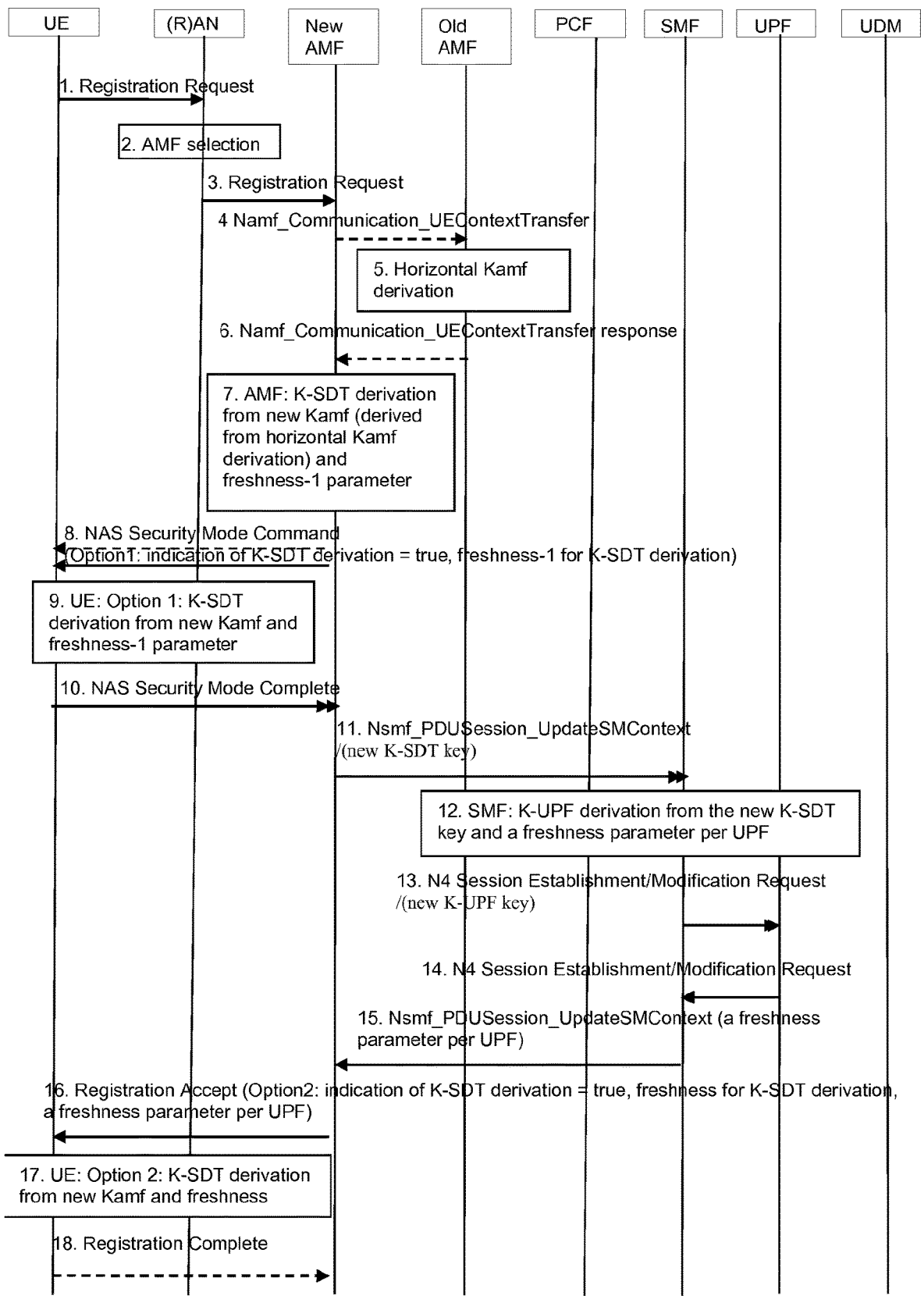
FIG. 9 is a signaling flow diagram of Enhanced Registration procedure with horizontal $K_{AMF}$ derivation for SDFP.
Figure 10:
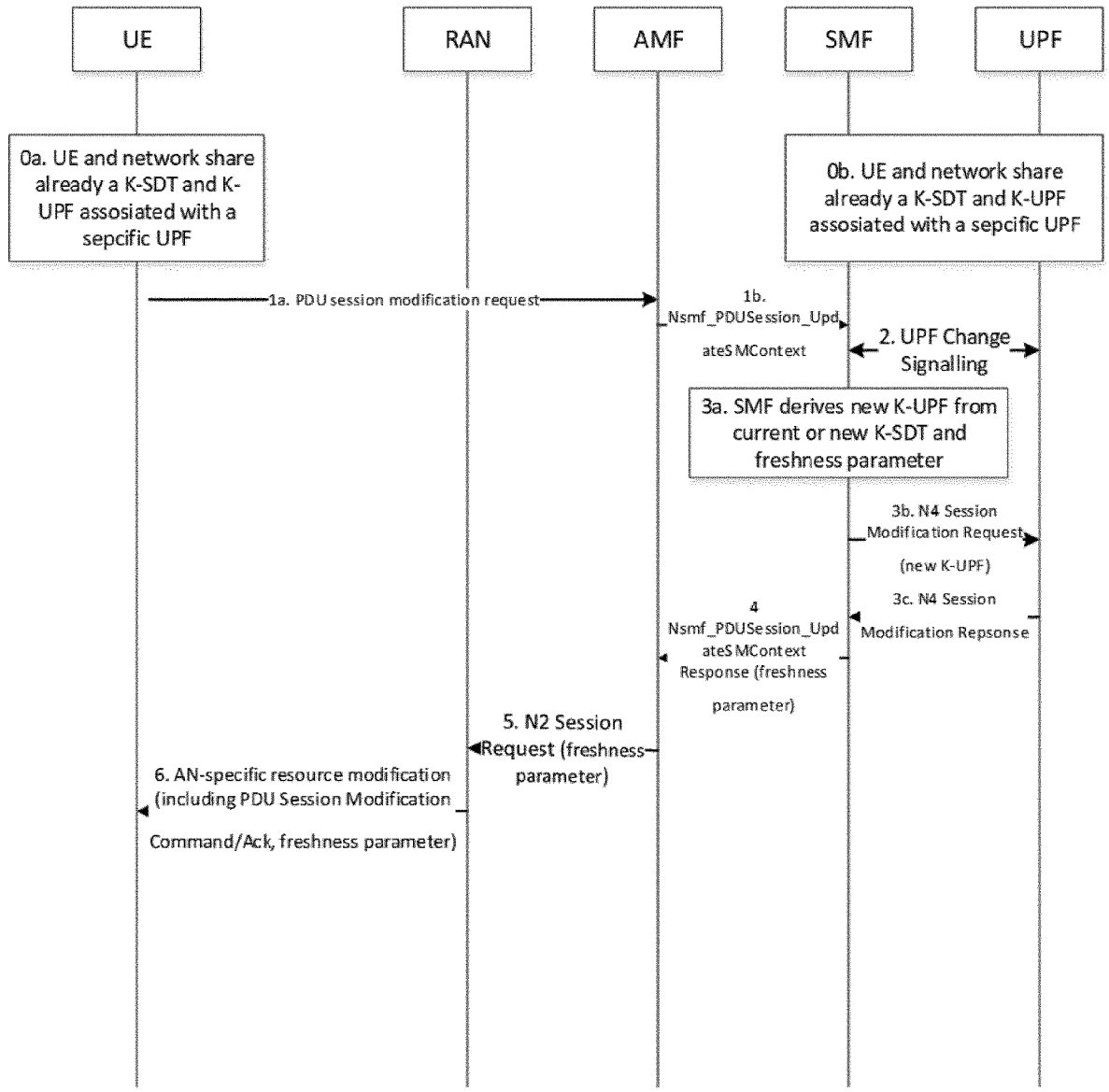
FIG. 10 is a signaling flow diagram of Enhanced PDU Session Modification procedure with K-UPF change

As shown in FIG. 9, for example:
0. It is assumed that the UE, is registered and that the UE and the AMF have already established and activated a NAS security context. The UE and AMF/SMF/UPF have also established and activated security context for SDFP.
1. At one point, the UE determines that it must initiate registration update procedure. For example, when the UE enters a new Tracking Area (or new Registration Area) currently not part of the UE registration area.
2. RAN selects AMF.
3. The RAN sends a registration request to the new AMF
4. The AMF may need to contact an old AMF in order to retrieve the UE security context.
5. The old AMF decides to initiate horizontal Kamf derivation due to AMF change. Note that if no AMF re-allocation has taken place and if the AMF decides to initiate NAS keys refresh, and initiates horizontal Kamf derivation, then the step 6 is not taking place in FIG. 9. The same steps as related to old AMF and new AMF are handled by one and the same AMF.
6. The old AMF includes the new Kamf derived from the old Kamf in horizontal Kamf derivation to the new AMF.
7. If the new AMF receives a new Kamf (derived from horizontal Kamf derivation in old AMF) from the old AMF, then if SDFP feature is established between the UE and the AMF/SMF/UPF, then the new AMF derives a new K-SDT key from K-AMF key using a freshness-1 parameter.
8. In order to activate the newly derived $K_{AMF}$ key, the new AMF triggers a NAS SMC run as described for the idle mode mobility case in TS 33.501 [2]. Option 1: then if SDFP feature is established between the UE and the AMF/SMF/UPF, in order to activate the new K-SDT key in the UE and network, then the AMF includes an indication of K-SDT derivation set to true and (optionally) a freshness-1 parameter in the NAS Security Mode Command message.
9. When the UE receives the NAS SMC: Option 1: Then if SDFP feature is established between the UE and the AMF/SMF/UPF, then the UE derives a new K-SDT key from K-AMF key using a freshness-1 parameter.
10. The UE responds with NAS Security Mode Complete message.
11. Also, during the UE registration update, the AMF notifies the SMF about the UE location. If SDFP feature is established between the UE and the AMF/SMF/UPF, then the AMF includes the new K-SDT key to the SMF.
12. The SMF derives a new K-UPF key per UPF from the K-SDT key and a freshness parameter unique for this UPF.
13. The SMF forwards the new K-UPF key to the UPF.
14. The UPF derives an integrity key and encryption key from the K-UPF key and the selected algorithms identifier.
15. The UPF responds to SMF.
16. The SMF responds back to AMF including a freshness parameter unique per activated UPF.
17. Option 2: if SDFP feature is established between the UE and the AMF/SMF/UPF, in order to activate the new K-SDT key in the UE and network, then the AMF includes an indication of K-SDT derivation set to true and a freshness-1 parameter in the Registration Accept message. The AMF includes also a freshness parameter unique per activated UPF received from SMF.
18. When the UE receives the Registration Accept message: Option 2: Then if SDFP feature is established between the UE and the AMF/SMF/UPF, then the UE derives a new K-SDT key from K-AMF key using a freshness-1 parameter. If the AMF included also a freshness parameter unique per activated UPF received from SMF, then the UE derives a new K-UPF key per UPF from the K-AMF key using the received freshness parameter unique per activated UPF. As a result of a successful completion of step 18, the UE and the AMF/SMF/UPF will share a new security context for SDFP. Option 2: when AMF wants to refresh its NAS keys (i.e. no AMF change).

Note that, if no AMF re-allocation has taken place and if the AMF decides to initiate NAS keys refresh, and initiates horizontal Kamf derivation, then the steps taking place in FIG. 9 related to old AMF and new AMF are handled by one and the same AMF. Alternatively or additionally to the embodiments described above, during a UPF change for example following a PDU session modification procedure as described in clause 4.3.3 of TS 23.502 [4], some embodiments allow changing the keys (here K-UPF) used at the target UPF so as to mitigate the effect of a potential UPF compromise. The K-UPF key change may also be required for other reasons than UPF change, e.g. counter wrap around should counters be used to protect the user-data between the UE and the UPF.

Figure ZZ3 illustrates the enhancement required to the PDU Session modification procedure in order to allow for change and activation of a new K-UPF key according to some embodiments.

0. It is assumed that the UE and the network already share a K-SDT and K-UPF. These security parameters could have been established earlier by the mechanism illustrated in FIG. 9.
1. The UE initiates a PDU Session Modification procedure. This is for the modification of an already established PDU Session. The AMF accordingly sends a PDU Session Update SM Context message to the SMF handling the session being updated.
2. The SMF may trigger additional signaling involving several network functions such as the UDM and the PCF. This exchange may also result in the allocation of a new UPF function for the session being updated.
3. The SMF may derive a new K-UPF key for the UPF due to UPF change or due to counter close to wrap-around value or due to local operator policy, etc. If a new K-UPF is generated, then it is included in N4 Session Modification Request message to the UPF as in step 13 in FIG. 9. The UPF replies with N4 Session Modification Response message as expected.
4. The SMF replies to the AMF with a response to the PDU Session Update SM Context message including the freshness parameter
5. The AMF sends an N2 Session Request message to RAN including a the freshness parameter. The N2 request message includes the PDU Session Modification Response message from the SMF to be delivered to the UE. The freshness parameter is carried within that SMF message inside the N2 Session Request.
6. The RAN initiates AN signaling which results in the delivery of the SMF message including the freshness parameter. Upon receipt of the freshness parameter, the UE derives a new K-UPF and in some embodiments starts immediately using it.

Small data communications as used herein may refer to data communications performed according to an architecture, process, or procedure designed or particularly suited for communicating small amounts of data (e.g., per connection or session), such that it is this architecture, process, or procedure that characterizes the small data communications more so than the exact "size" of the data being communicated. The architecture, process, or procedure may for instance involve a wireless device suspending and resuming a previously established connection or session for data communications, so as to re-use configuration(s) rather than having to re-establish them from scratch and incur associated control signalling overhead. Alternatively or additionally, the architecture, process, or procedure may involve user plane core network equipment (e.g., UPF) being an endpoint of security for the small data communications. In these and other embodiments, small data communications may refer to data communications performed according to SDFP and/or UP CIoT EPS optimization.

Note too that, although some embodiments herein have been described particularly in the context of small data communications, embodiments herein may be extended to any data communications over the user plane. Discussions with respect to "small data communications" may therefore in some embodiments be generalized by replacing "small data communications" with simply "data communications".

Figure 11:
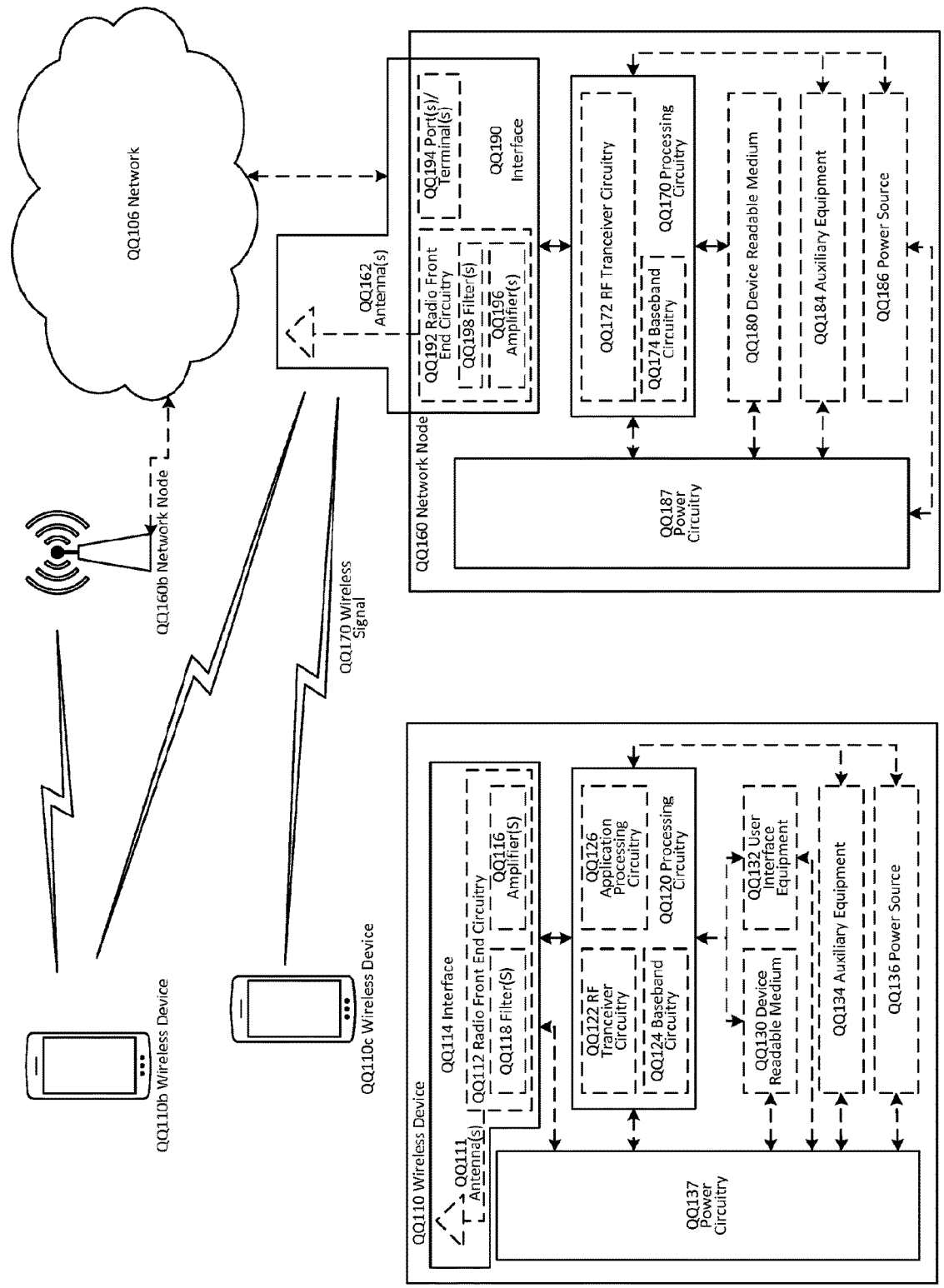
FIG. 11 is a block diagram of a wireless network according to some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network equipment refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network equipment include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. Network equipment may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network equipment include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network equipment (e.g., MSCs, MMEs), O&M nodes, OSS nodes, SON nodes, positioning nodes (e.g., E-SMLCs), and/or MDTs. As another example, network equipment may implement a virtual network node as described in more detail below. More generally, however, network equipment may represent any suitable device (or group of devices) capable, configured, arranged, and/or operable to enable and/or provide a wireless device with access to the wireless network or to provide some service to a wireless device that has accessed the wireless network. In the below description, the term network node is used interchangeably with network equipment.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination. Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170.

Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160.

Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187.

As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used. Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination. Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
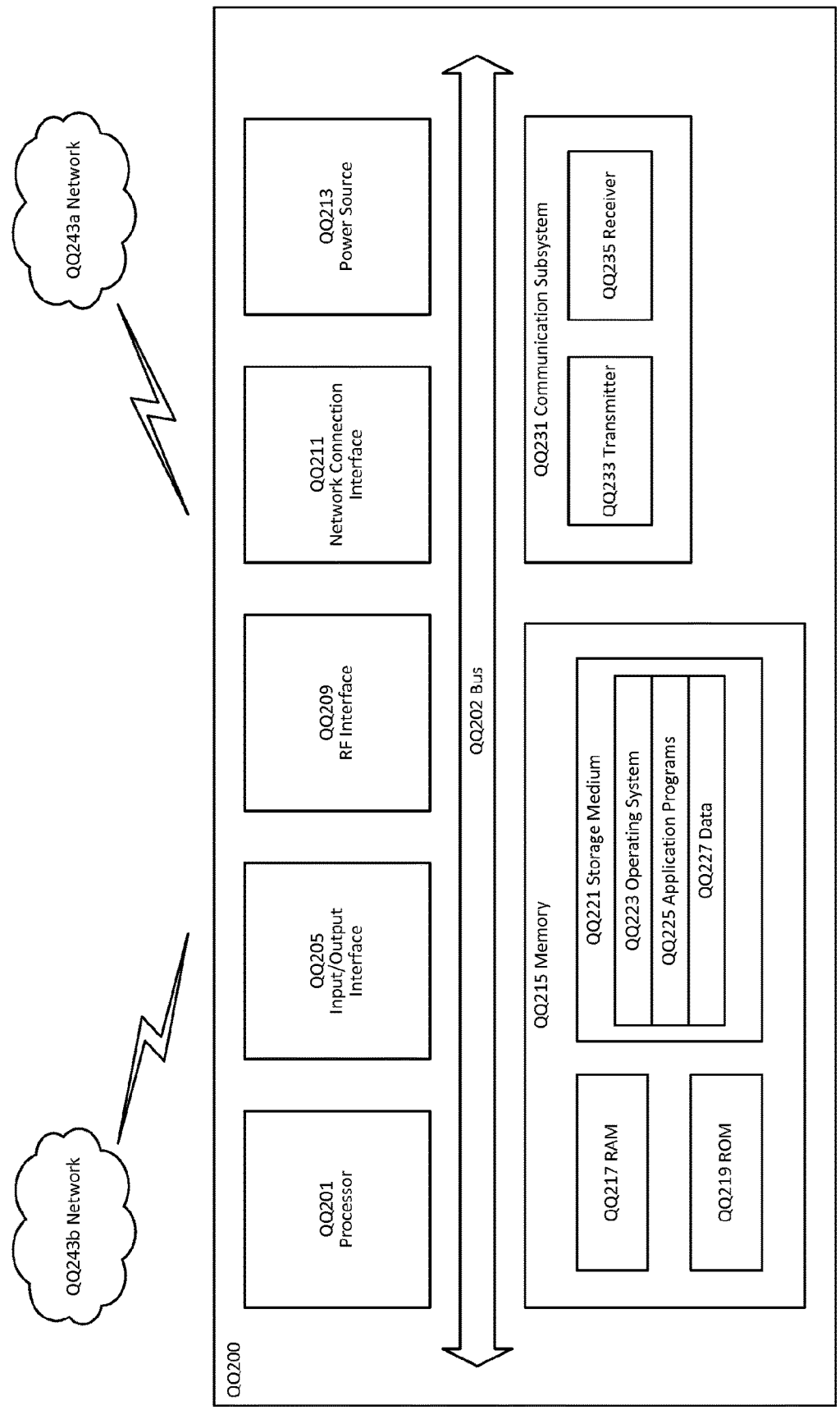
FIG. 12 is a block diagram of a UE according to some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
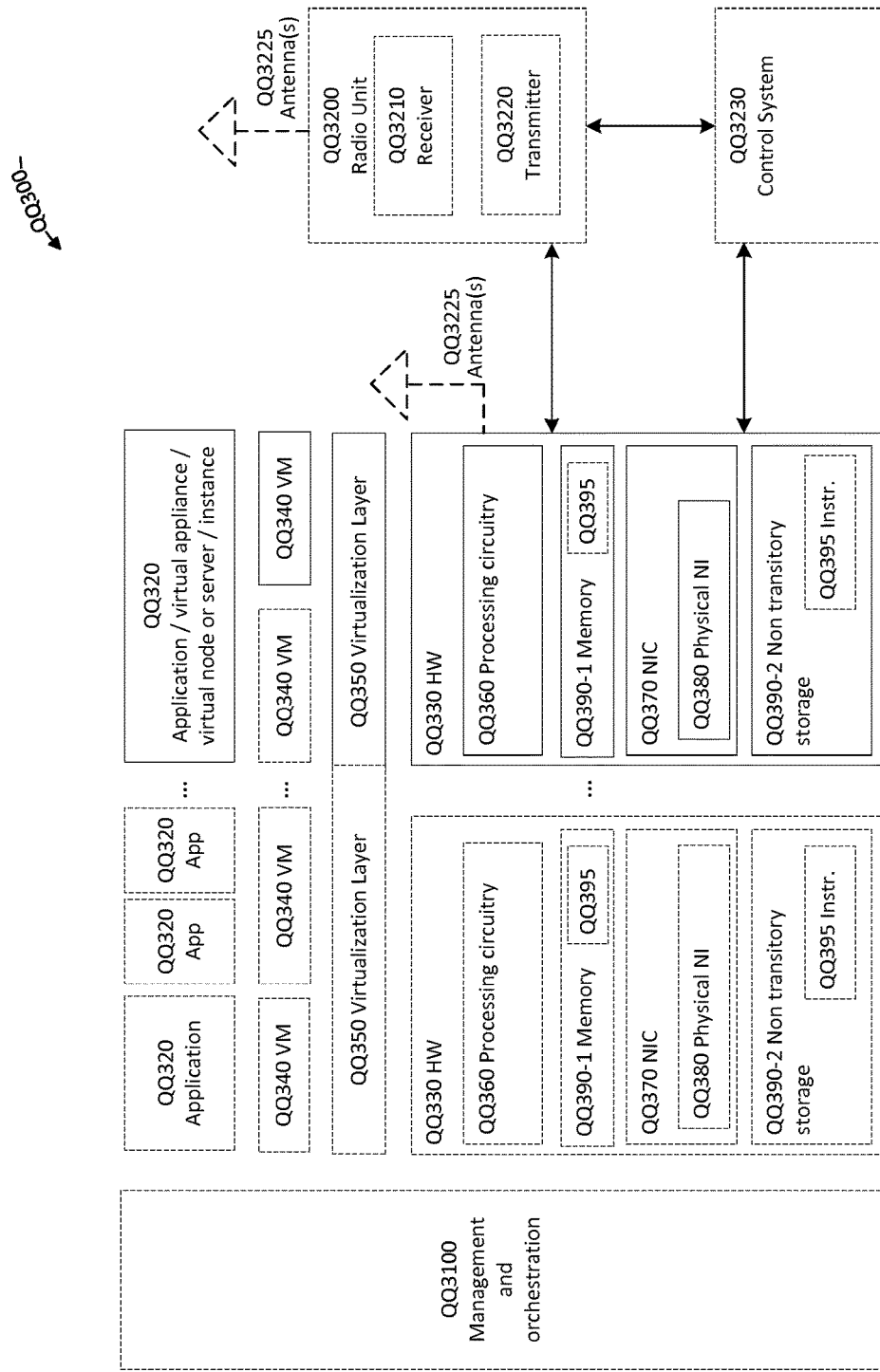
FIG. 13 is a schematic block diagram illustrating a virtualization environment according to some embodiments

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340. As shown in FIG. 13, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
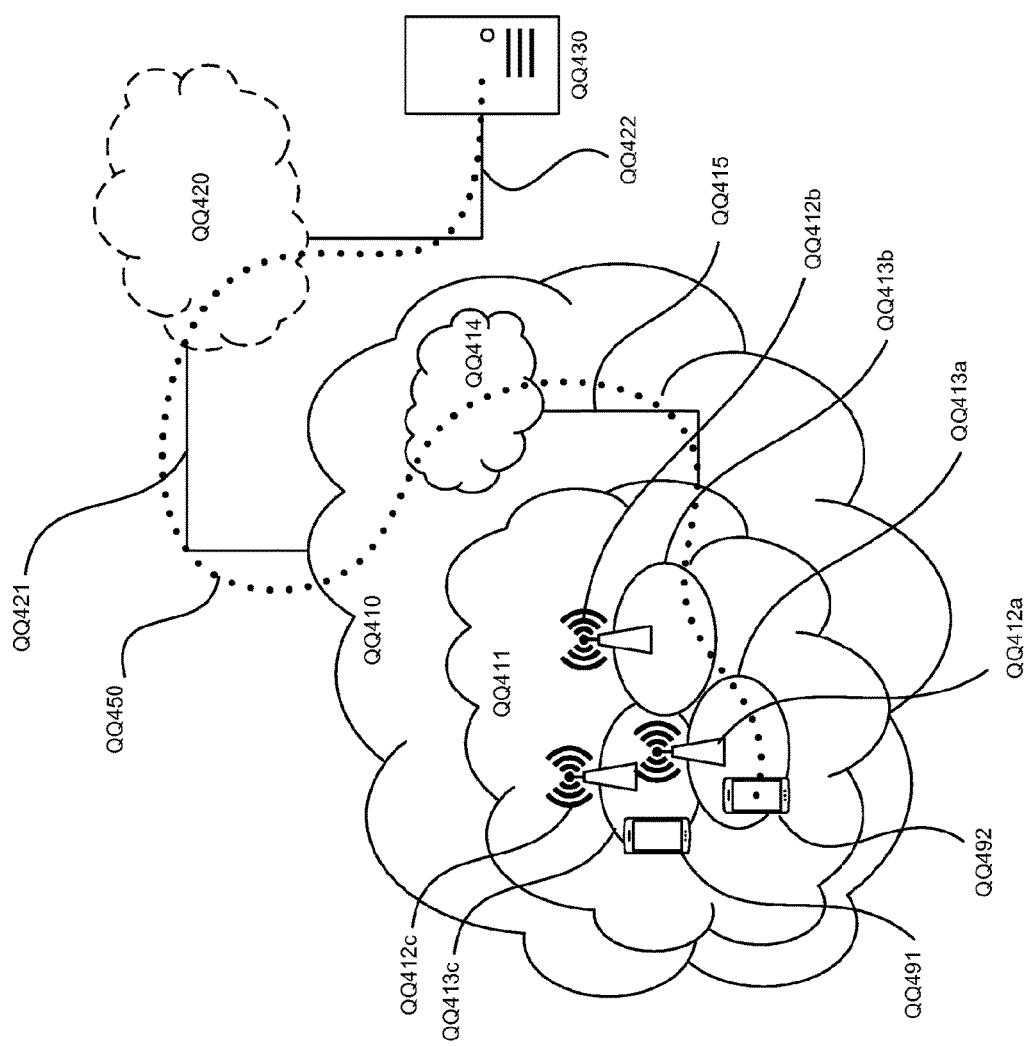
FIG. 14 is a block diagram of a host computer according to some embodiments.

FIG. 14 illustrates a telecommunication network connected via an intermediate network to a host computer in accordance with some embodiments. In particular, with reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
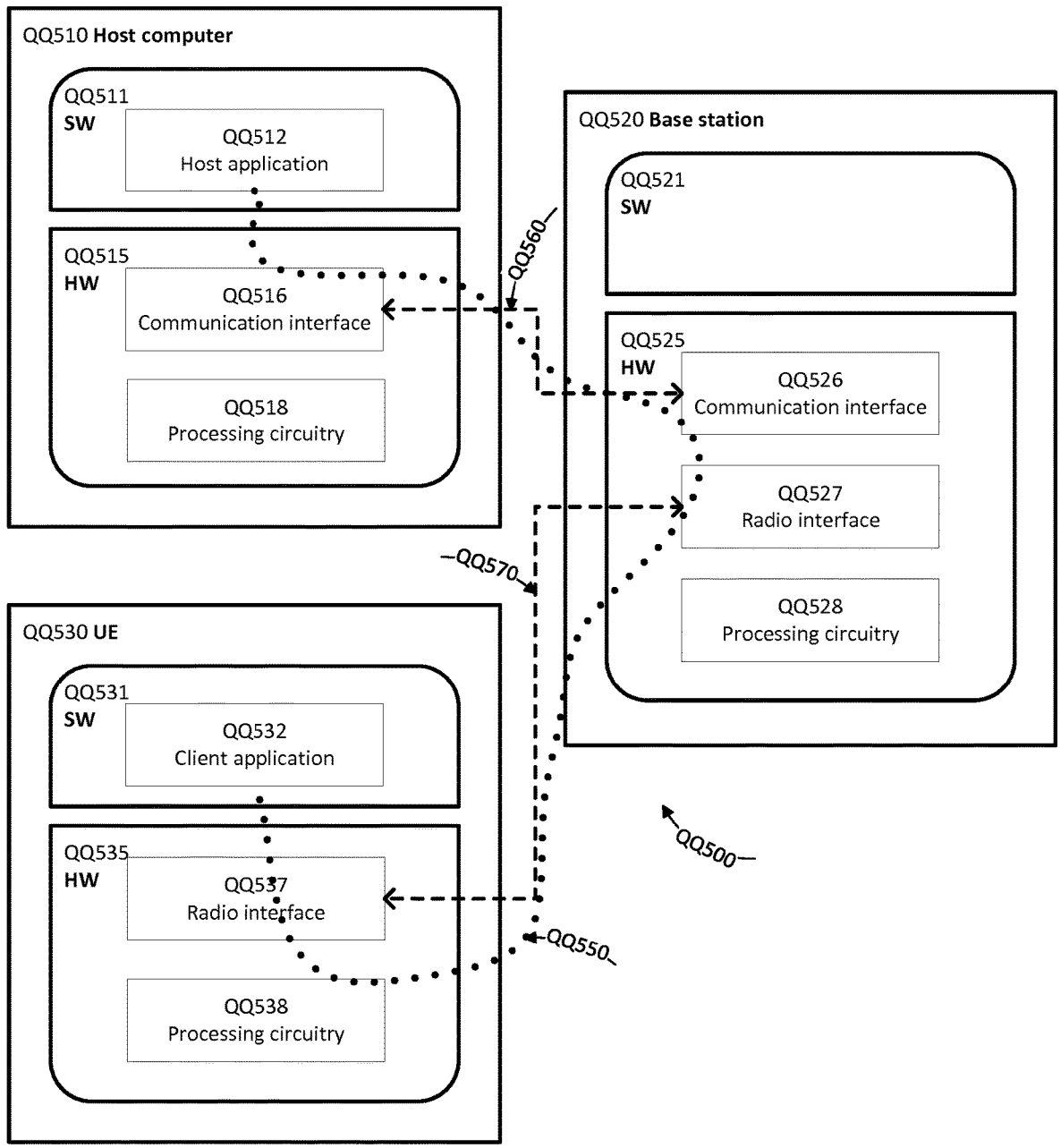
FIG. 15 is a flowchart illustrating a method implemented in a communication system, in accordance with one embodiment.

Example implementations, in accordance with an embodiment, of the UE, base station and host computer discussed in the preceding paragraphs will now be described with reference to FIG. 15. FIG. 15 illustrates host computer communicating via a base station with a user equipment over a partially wireless connection in accordance with some embodiments In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve small data communication protection, e.g., for mobility scenarios.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figures 16, 17:
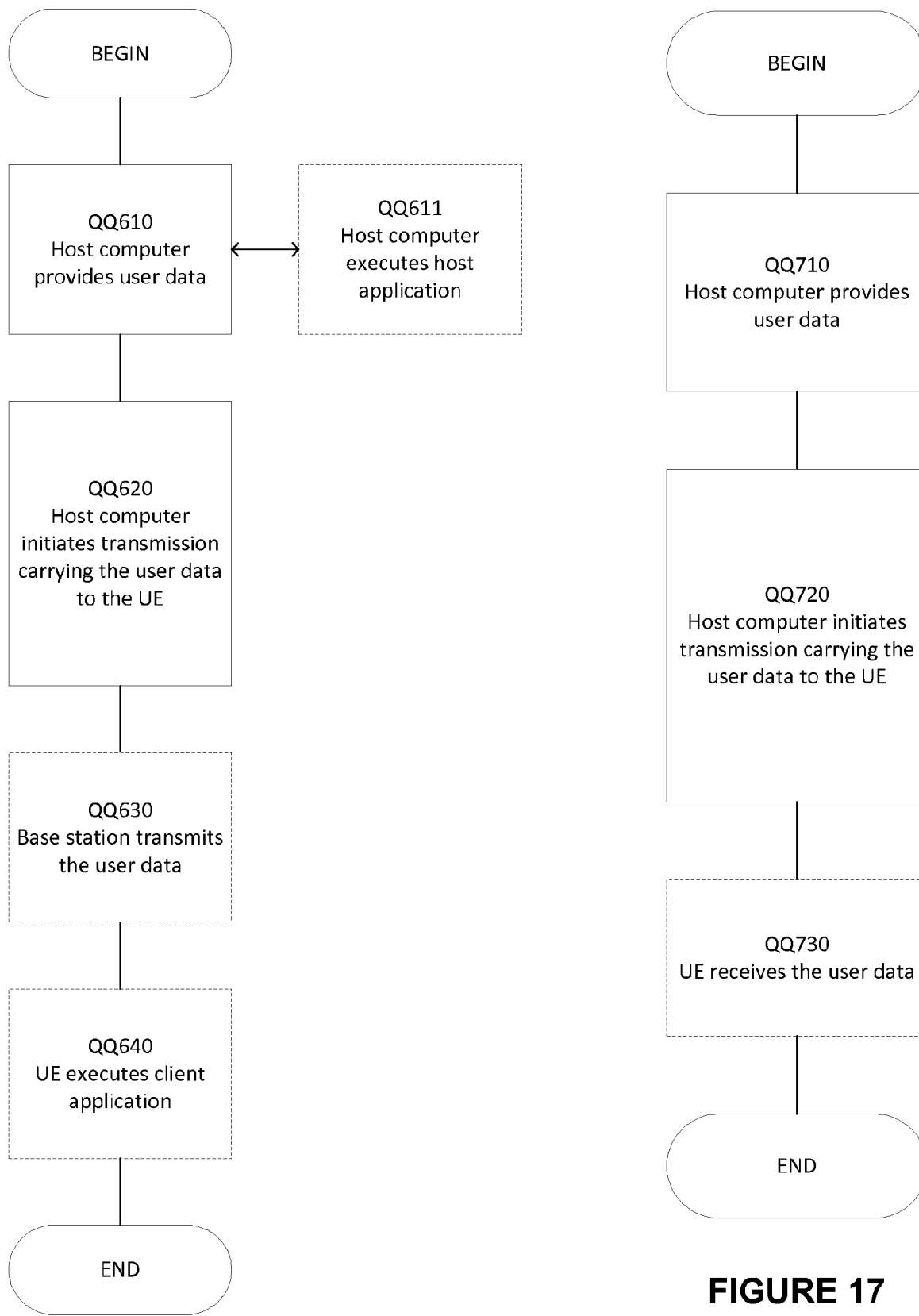
FIG. 16 is a flowchart illustrating a method implemented in a communication system, in accordance with one embodiment.
FIG. 17 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 18, 19:
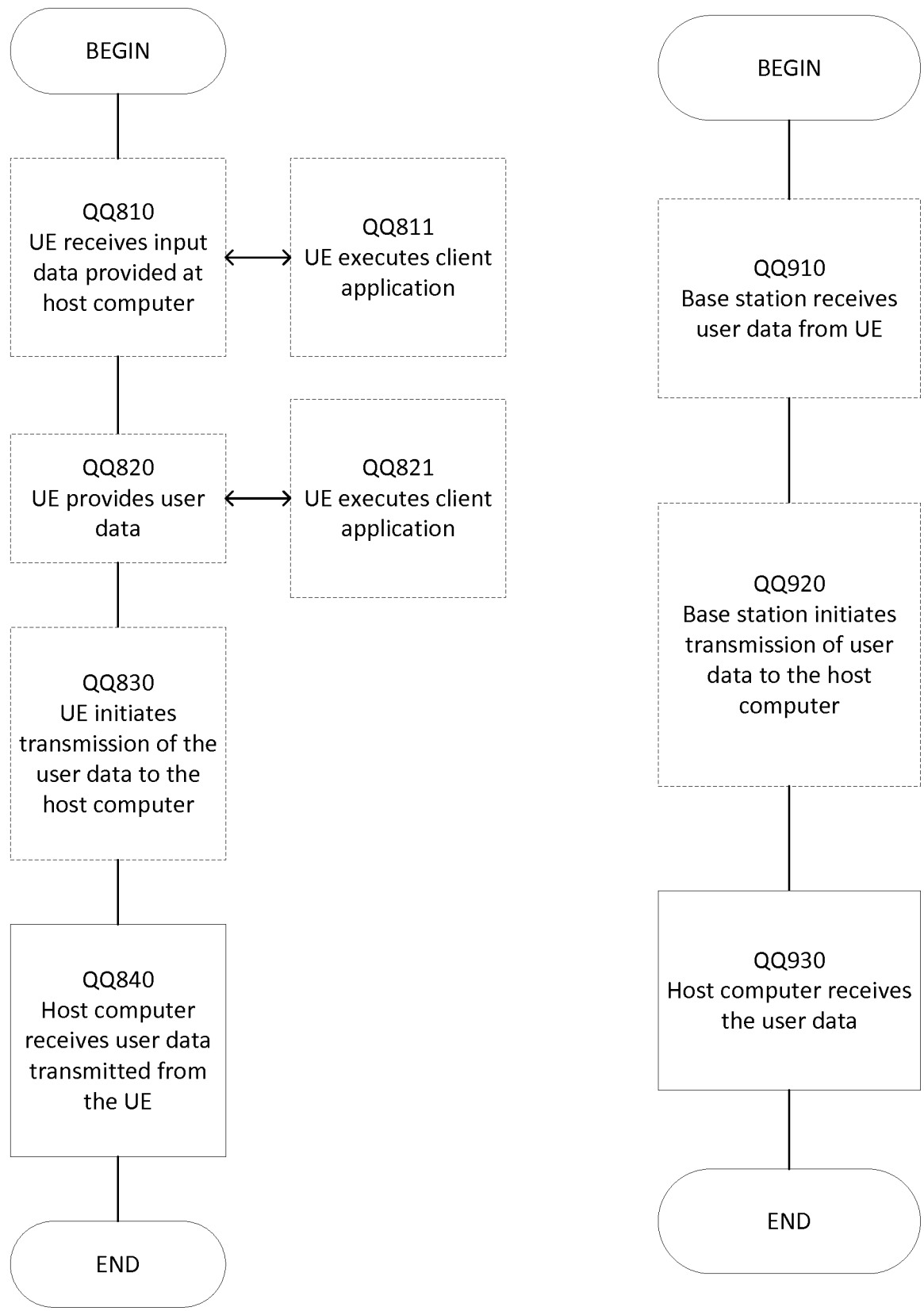
FIG. 18 is a flowchart illustrating a method implemented in a communication system, in accordance with one embodiment.
FIG. 19 is a flowchart illustrating a method implemented in a communication system, in accordance with one embodiment.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The following are certain enumerated embodiments further illustrating various aspects the disclosed subject matter.

A1. A method performed by a wireless device for small data communications over a user plane in a wireless communication network, the method comprising:

receiving, from mobility management network equipment, control signaling indicating that the wireless device is to horizontally derive a base security key and/or that the wireless device is to derive a small data transfer, SDT, security key from the base security key, wherein the base security key is included in a non-access stratum, NAS, security context at the wireless device and at the mobility management network equipment; and responsive to receiving the control signaling, deriving the SDT security key from the base security key and a freshness parameter.

A2. The method of embodiment A1, further comprising horizontally deriving the base security key.

A3. The method of any of embodiments A1-A2, further comprising deriving, from the SDT security key, a user plane security key (e.g., included in a small data security context established at the wireless device and at user plane core network equipment).

A4. The method of embodiment A3, further comprising transmitting or receiving, over a user plane path between the wireless device and the user plane core network equipment, small data communications as protected with the user plane security key or a derivative thereof.

A5. The method of any of embodiments A3-A4, wherein the user plane security key is a key $K_{UPF}$.

A6. The method of any of embodiments A3-A5, wherein the user plane core network equipment implements a user plane function, UPF, or implements a proxy co-located with the UPF.

A7. The method of any of embodiments A3-A6, wherein the small data communications comprise small data fast path, SDFP, communications.

A8. The method of embodiment A7, wherein the method further comprises transmitting, to radio network equipment, control signaling describing the user plane path, and wherein the small data communications are transmitted or received over the user plane path via the radio network equipment.

A9. The method of any of embodiments A3-A9, wherein the small data security context persists at the wireless device and at the user plane core network equipment while the wireless device is in a radio resource control, RRC, inactive mode in which an RRC connection of the wireless device is suspended.

A10. The method of any of embodiments A1-A9, wherein the small data communications comprise data communications performed according to user plane, UP, cellular internet-of-things, CIoT, Evolved Packet System, EPS, optimization.

A11. The method of any of embodiments A1-A10, wherein the control signaling indicates that the wireless device is to derive the SDT security key.

A12. The method of any of embodiments A1-A11, wherein the control signaling indicates that the wireless device is to derive the SDT security key from the base security key and the freshness parameter.

A13. The method of any of embodiments A1-A12, wherein the control signaling further indicates the freshness parameter.

A14. The method of any of embodiments A1-A13, wherein receiving the control signaling comprises receiving a NAS security mode command that includes the control signaling.

A15. The method of any of embodiments A1-A14, further comprising transmitting a registration request that requests registration of the wireless device with the wireless communication network, and wherein receiving the control signaling comprises receiving a registration accept message that is a response to the registration request and that includes the control signaling.

A16. The method of any of embodiments A1-A15, wherein receiving the control signaling comprises receiving the control signaling during, as part of, or in response to completion of a mobility registration update procedure.

A17. The method of embodiment A16, wherein the mobility registration update procedure changes which mobility management network equipment serves the wireless device.

A18. The method of embodiment A17, wherein the mobility registration update procedure changes the mobility management network equipment that serves the wireless device to a new mobility management network equipment, and wherein the control signaling is received from the new mobility management network equipment.

A19. The method of any of embodiments A1-A18, wherein the SDT key is a key $K_{SDT}$.

A20. The method of any of embodiments A1-A19, wherein the freshness parameter comprises an identifier of session management network equipment that serves the wireless device, a packet data unit, PDU, session identifier, a random value, or a counter.

A21. The method of any of embodiments A1-A20, wherein the control signaling includes an explicit indicator or flag that indicates the wireless device is to horizontally derive the base security key and/or that the wireless device is to derive the SDT security key.

A22. The method of any of embodiments A1-A21, wherein the mobility management network equipment implements an access and mobility function, AMF.

A23. The method of any of embodiments A1-A22, wherein horizontal derivation of the base security key comprises derivation of the base security key from an old base security key such that the base security key is at the same hierarchical level of a key hierarchy as the old base security key.

A24. A method performed by a wireless device for small data communications in a wireless communication network, the method comprising:
deriving, from a small data transfer, SDT, security key (e.g., included in a small data security context established at the wireless device and at mobility management network equipment configured for mobility management), a user plane security key in the small data security context;
receiving control signaling indicating that the wireless device is to derive a new user plane security key in the small data security context; and
deriving, from the SDT security key or a new SDT security key, and from a freshness parameter, the new user plane security key in the small data security context.

A25. The method of embodiment A24, further comprising transmitting or receiving, over a user plane path between the wireless device and user plane core network equipment, small data communications as protected with the user plane security key or a derivative thereof.

A26. The method of any of embodiments A24-A25, wherein the control signaling implicitly indicates that the wireless device is to derive the new user plane security key by indicating the freshness parameter from which the new user plane security key is to be derived.

A27. The method of any of embodiments A24-A26, wherein the control signaling includes the freshness parameter.

A28. The method of any of embodiments A24-A27, further comprising transmitting a packet data unit, PDU, session modification request that requests modification of an established PDU session for the wireless device, and wherein receiving the control signaling comprises receiving the control signaling in or in association with a PDU session modification response that is a response to the PDU session modification request.

A29. The method of any of embodiments A24-A28, wherein receiving the control signaling comprises receiving the control signaling during, as part of, or in response to completion of a PDU session modification procedure.

A30. The method of embodiment A29, wherein the PDU session modification procedure changes which user plane core network equipment serves the wireless device.

A31. The method of any of embodiments A24-A30, wherein the SDT security key is a key $K_{SDT}$.

A32. The method of any of embodiments A24-A31, wherein the user plane security key is a key $K_{UPF}$.

A33. The method of any of embodiments A24-A32, wherein the freshness parameter comprises an identifier of session management network equipment that serves the wireless device, a packet data unit, PDU, session identifier, a random value, or a counter.

A34. The method of embodiment A25, wherein the user plane core network equipment implements a user plane function, UPF, or implements a proxy co-located with the UPF.

A35. The method of any of embodiments A24-A34, wherein the mobility management network equipment implements an access and mobility function, AMF.

A36. The method of any of embodiments A24-A35, wherein the small data communications comprise small data fast path, SDFP, communications.

A37. The method of embodiment A25, wherein the method further comprises transmitting, to radio network equipment, control signaling describing the user plane path, and wherein the small data communications are transmitted or received over the user plane path via the radio network equipment.

A38. The method of any of embodiments A24-A38, wherein the small data security context persists while the wireless device is in a radio resource control, RRC, inactive mode in which an RRC connection of the wireless device is suspended.

A39. The method of any of embodiments A24-A38, wherein small data communications comprise data communications performed according to user plane, UP, cellular internet-of-things, CIoT, Evolved Packet System, EPS, optimization.

B1. A method performed by mobility management network equipment for facilitating small data communications over a user plane in a wireless communication network, the method comprising:
transmitting, from the mobility management network equipment to a wireless device, control signaling indicating that the wireless device is to horizontally derive a base security key and/or that the wireless device is to derive a small data transfer, SDT, security key from the base security key, wherein the base security key is included in a non-access stratum, NAS<security context for the wireless device.

B2. The method of embodiment B1, further comprising:
obtaining the base security key as horizontally derived from an old base security key; and
deriving, from the base security key and a freshness parameter, the SDT security key as included in a small data security context for the wireless device.

B3. The method of any of embodiments B1-B2, further comprising transmitting the SDT security key to session management equipment.

B4. The method of embodiment B1, wherein the control signaling further indicates a freshness parameter from which the wireless device is to derive the SDT security key.

B5. The method of any of embodiments B1-B4, wherein transmitting the control signaling comprises transmitting a NAS security mode command that includes the control signaling.

B6. The method of any of embodiments B1-B5, further comprising receiving a registration request that requests registration of the wireless device with the wireless communication network, and wherein transmitting the control signaling comprises transmitting a registration accept message that is a response to the registration request and that includes the control signaling.

B7. The method of any of embodiments B1-B6, wherein transmitting the control signaling comprises receiving the control signaling during, as part of, or in response to completion of a mobility registration update procedure for the wireless device.

B8. The method of embodiment B7, wherein the mobility registration update procedure changes which mobility management network equipment serves the wireless device.

B9. The method of embodiment B8, wherein the mobility registration update procedure changes the mobility management network equipment that serves the wireless device to a new mobility management network equipment, and wherein the control signaling is transmitted from the new mobility management network equipment.

B10. The method of any of embodiments B1-B9, wherein the SDT key is a key $K_{SDT}$.

B11. The method of any of embodiments B2 and B4, wherein the freshness parameter comprises an identifier of session management network equipment that serves the wireless device, a packet data unit, PDU, session identifier, a random value, or a counter.

B12. The method of any of embodiments B1-B11, wherein the control signaling includes an explicit indicator or flag that indicates the wireless device is to horizontally derive the base security key and/or that the wireless device is to derive the SDT security key.

B13. The method of any of embodiments B1-B15, wherein the mobility management network equipment implements an access and mobility function, AMF.

B14. The method of any of embodiments B1-B13, wherein the small data communications comprise small data fast path, SDFP, communications.

B15. The method of embodiment B2, wherein the small data security context persists while the wireless device is in a radio resource control, RRC, inactive mode in which an RRC connection of the wireless device is suspended.

B16. The method of any of embodiments B1-B15, wherein small data communications comprise data communications performed according to user plane, UP, cellular internet-of-things, CIoT, Evolved Packet System, EPS, optimization.

X1. A method performed by session management network equipment for facilitating small data communications in a wireless communication network, the method comprising:

deriving, from a small data transfer, SDT, security key included in a small data security context for the wireless device, and from a freshness parameter, a new user plane security key in the small data security context; and transmitting control signaling indicating that the wireless device is to derive the new user plane security key in the small data security context.

X2. The method of embodiment X1, further comprising transmitting the new user plane security key to user plane core network equipment that is to transmit or receive small data communications with the user plane security key or a derivative thereof.

X3. The method of any of embodiments X1-X2, wherein the control signaling implicitly indicates that the wireless device is to derive the new user plane security key by indicating the freshness parameter from which the new user plane security key is to be derived.

X4. The method of any of embodiments X1-X3, wherein the control signaling includes the freshness parameter.

X5. The method of any of embodiments X1-X4, further comprising receiving a packet data unit, PDU, session update session management, SM, context request for the wireless device, and wherein transmitting the control signaling comprises transmitting the control signaling in or in association with a PDU session update SM context response that is a response to the PDU session update SM context request.

X6. The method of any of embodiments X1-X5, wherein transmitting the control signaling comprises transmitting the control signaling during, as part of, or in response to completion of a PDU session modification procedure or a PDU session update SM context procedure.

X7. The method of embodiment X6, wherein the PDU session modification procedure or the PDU session update SM context procedure changes which user plane core network equipment serves the wireless device.

X8. The method of any of embodiments X1-X7, wherein the SDT security key is a key $K_{SDT}$.

X9. The method of any of embodiments X1-X8, wherein the new user plane security key is a key $K_{UPF}$.

X10. The method of any of embodiments X1-X9, wherein the freshness parameter comprises an identifier of session management network equipment that serves the wireless device, a packet data unit, PDU, session identifier, a random value, or a counter.

X11. The method of any of embodiments X1-X10, wherein the user plane core network equipment implements a user plane function, UPF, or implements a proxy co-located with the UPF.

X12. The method of any of embodiments X1-X11, wherein the session management network equipment implements a session management function, SMF.

X13. The method of any of embodiments X1-X12, wherein the small data communications comprise small data fast path, SDFP, communications.

X14. The method of any of embodiments X1-X13, wherein the small data security context persists while the wireless device is in a radio resource control, RRC, inactive mode in which an RRC connection of the wireless device is suspended.

X15. The method of any of embodiments X1-X14, wherein small data communications comprise data communications performed according to user plane, UP, cellular internet-of-things, CIoT, Evolved Packet System, EPS, optimization.

C3. A wireless device comprising:

processing circuitry and memory, the memory containing instructions executable by the processing circuitry whereby the wireless device is configured to perform any of the steps of any of the Group A embodiments.

C6. A user equipment (UE) comprising:
- an antenna configured to send and receive wireless signals;
- radio front-end circuitry connected to the antenna and to processing circuitry, and configured to condition signals communicated between the antenna and the processing circuitry;
- the processing circuitry being configured to perform any of the steps of any of the Group A embodiments;
- an input interface connected to the processing circuitry and configured to allow input of information into the UE to be processed by the processing circuitry;
- an output interface connected to the processing circuitry and configured to output information from the UE that has been processed by the processing circuitry; and
- a battery connected to the processing circuitry and configured to supply power to the UE.

C7. A computer program comprising instructions which, when executed by at least one processor of a wireless device, causes the wireless device to carry out the steps of any of the Group A embodiments.

C8. A carrier containing the computer program of embodiment C7, wherein the carrier is one of an electronic signal, optical signal, radio signal, or computer readable storage medium.

C13. Mobility management network equipment comprising:
processing circuitry and memory, the memory containing instructions executable by the processing circuitry whereby the mobility management network equipment is configured to perform any of the steps of any of the Group B embodiments.

C14. A computer program comprising instructions which, when executed by at least one processor of mobility management network equipment, causes the mobility management network equipment to carry out the steps of any of the Group B embodiments.

C15. A carrier containing the computer program of embodiment C14, wherein the carrier is one of an electronic signal, optical signal, radio signal, or computer readable storage medium.

C20. Session management network equipment comprising:
processing circuitry and memory, the memory containing instructions executable by the processing circuitry whereby the session management network equipment is configured to perform any of the steps of any of the Group X embodiments.

C21. A computer program comprising instructions which, when executed by at least one processor of session management network equipment, causes the mobility management network equipment to carry out the steps of any of the Group X embodiments.

C22. A carrier containing the computer program of embodiment C21, wherein the carrier is one of an electronic signal, optical signal, radio signal, or computer readable storage medium.

D1. A communication system including a host computer comprising:
processing circuitry configured to provide user data; and
a communication interface configured to forward the user data to a cellular network for transmission to a user equipment (UE),
wherein the cellular network comprises network equipment having a communication interface and processing circuitry, the network equipment's processing circuitry configured to perform any of the steps of any of the Group B or Group X embodiments.

D2. The communication system of the pervious embodiment further including the network equipment.

D3. The communication system of the previous 2 embodiments, further including the UE, wherein the UE is configured to communicate with the network equipment.

D4. The communication system of the previous 3 embodiments, wherein:
the processing circuitry of the host computer is configured to execute a host application, thereby providing the user data; and
the UE comprises processing circuitry configured to execute a client application associated with the host application.

D5. A method implemented in a communication system including a host computer, network equipment and a user equipment (UE), the method comprising:
at the host computer, providing user data; and
at the host computer, initiating a transmission carrying the user data to the UE via a cellular network comprising the network equipment, wherein the network equipment performs any of the steps of any of the Group B or Group X embodiments.

D6. The method of the previous embodiment, further comprising, at the network equipment, transmitting the user data.

D7. The method of the previous 2 embodiments, wherein the user data is provided at the host computer by executing a host application, the method further comprising, at the UE, executing a client application associated with the host application.

D8. A user equipment (UE) configured to communicate with network equipment, the UE comprising a radio interface and processing circuitry configured to perform any of the previous 3 embodiments.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

D10. The communication system of the previous embodiment, wherein the cellular network further includes network equipment configured to communicate with the UE.

D11. The communication system of the previous 2 embodiments, wherein:
the processing circuitry of the host computer is configured to execute a host application, thereby providing the user data; and
the UE's processing circuitry is configured to execute a client application associated with the host application.

D12. A method implemented in a communication system including a host computer, network equipment and a user equipment (UE), the method comprising:
at the host computer, providing user data; and
at the host computer, initiating a transmission carrying the user data to the UE via a cellular network comprising the network equipment, wherein the UE performs any of the steps of any of the Group A embodiments.

D13. The method of the previous embodiment, further comprising at the UE, receiving the user data from the network equipment.

D14. A communication system including a host computer comprising:
communication interface configured to receive user data originating from a transmission from a user equipment (UE),
wherein the UE comprises a radio interface and processing circuitry, the UE's processing circuitry configured to perform any of the steps of any of the Group A embodiments.

D15. The communication system of the previous embodiment, further including the UE.

D16. The communication system of the previous 2 embodiments, further including network equipment, wherein the network equipment comprises a communication interface configured to communicate with the UE.

D17. The communication system of the previous 3 embodiments, wherein:
the processing circuitry of the host computer is configured to execute a host application; and the UE's processing circuitry is configured to execute a client application associated with the host application, thereby providing the user data.

D18. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

D19. A method implemented in a communication system including a host computer, network equipment and a user equipment (UE), the method comprising:

at the host computer, receiving user data transmitted from the UE, wherein the UE performs any of the steps of any of the Group A embodiments.

D22. A communication system including a host computer comprising a communication interface configured to receive user data originating from a transmission from a user equipment (UE) via a cellular network that includes network equipment, wherein the network equipment comprises a communication interface and processing circuitry, the network equipment's processing circuitry configured to perform any of the steps of any of the Group B or Group X embodiments.

The invention claimed is:

1. A method performed by a wireless device for small data communications over a user plane in a wireless communication network, the method comprising:

receiving, from mobility management network equipment, control signaling indicating that the wireless device is to horizontally derive a base security key and/or that the wireless device is to derive a small data transfer (SDT) security key from the base security key, wherein the base security key is included in a non-access stratum (NAS) security context at the wireless device and at the mobility management network equipment; and responsive to receiving the control signaling, deriving the SDT security key from the base security key and a freshness parameter.

2. The method of claim 1, further comprising horizontally deriving the base security key.

3. The method of claim 1, further comprising deriving, from the SDT security key, a user plane security key.

4. The method of claim 1, wherein the control signaling indicates at least one of:

that the wireless device is to derive the SDT security key;

that the wireless device is to derive the SDT security key from the base security key and the freshness parameter; and the freshness parameter.

5. The method of claim 1, wherein the control signaling includes an explicit indicator, or flag, that indicates the wireless device is to horizontally derive the base security key and/or that the wireless device is to derive the SDT security key.

6. The method of claim 1, wherein the mobility management network equipment implements an access and mobility function (AMF).

7. A method performed by a wireless device for small data communications in a wireless communication network, the method comprising:

deriving, by the wireless device, from a small data transfer (SDT) security key, a user plane security key in the small data security context;

receiving, by the wireless device, control signaling indicating that the wireless device is to derive a new user plane security key in the small data security context; and deriving, by the wireless device, from the SDT security key or a new SDT security key, and from a freshness parameter, the new user plane security key in the small data security context.

8. The method of claim 7, further comprising transmitting or receiving, over a user plane path between the wireless device and user plane core network equipment, small data communications as protected with the user plane security key or a derivative thereof.

9. The method of claim 7, wherein the control signaling implicitly indicates that the wireless device is to derive the new user plane security key by indicating the freshness parameter from which the new user plane security key is to be derived.

10. The method of claim 7, wherein the control signaling includes the freshness parameter.

11. A method performed by mobility management network equipment for facilitating small data communications over a user plane in a wireless communication network, the method comprising:

transmitting, from the mobility management network equipment to a wireless device, control signaling indicating that the wireless device is to horizontally derive a base security key and/or that the wireless device is to derive a small data transfer (SDT) security key from the base security key, wherein the base security key is included in a non-access stratum (NAS) security context for the wireless device.

12. The method of claim 11, further comprising:

obtaining the base security key as horizontally derived from an old base security key; and deriving, from the base security key and a freshness parameter, the SDT security key as included in a small data security context for the wireless device.

13. The method of claim 12, further comprising transmitting the SDT security key to session management equipment.

14. The method of claim 12, wherein the control signaling further indicates a freshness parameter from which the wireless device is to derive the SDT security key.

15. The method of claim 12, wherein the control signaling includes an explicit indicator, or flag, that indicates the wireless device is to horizontally derive the base security key and/or that the wireless device is to derive the SDT security key.

16. The method of claim 12, wherein the mobility management network equipment implements an access and mobility function (AMF).

17. A method performed by session management network equipment for facilitating small data communications in a wireless communication network, the method comprising:

deriving, by the session management network equipment, from a small data transfer (SDT) security key included in a small data security context for the wireless device, and from a freshness parameter, a new user plane security key in the small data security context; and transmitting, by the session management network equipment, control signaling indicating that the wireless device is to derive the new user plane security key in the small data security context.

18. The method of claim 17, further comprising transmitting the new user plane security key to user plane core network equipment that is to transmit or receive small data communications with the user plane security key or a derivative thereof.

19. The method of claim 17, wherein the control signaling implicitly indicates that the wireless device is to derive the new user plane security key by indicating the freshness parameter from which the new user plane security key is to be derived.

20. The method of claim 17, wherein the control signaling includes the freshness parameter.

21. The method of claim 1, wherein the base security key is a key $K_{AMF}$.

22. The method of claim 11, wherein the base security key is a key $K_{AMF}$.

* * * * *